US012365567B2

(12) United States Patent
Maedo et al.

(10) Patent No.: US 12,365,567 B2
(45) Date of Patent: Jul. 22, 2025

(54) WORK MACHINE SUSPENSION DEVICE, RETENTION DEVICE, AND METHOD FOR SUSPENDING STRUCTURE MEMBER

(71) Applicant: KOBELCO CONSTRUCTION MACHINERY CO., LTD., Hiroshima (JP)

(72) Inventors: Teppei Maedo, Hiroshima (JP); Yasuhiko Shimazu, Hiroshima (JP); Nobuhiro Takamatsu, Hiroshima (JP); Kazufumi Kudara, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 732 days.

(21) Appl. No.: 17/640,719

(22) PCT Filed: Aug. 24, 2020

(86) PCT No.: PCT/JP2020/031865
§ 371 (c)(1),
(2) Date: Mar. 4, 2022

(87) PCT Pub. No.: WO2021/054057
PCT Pub. Date: Mar. 25, 2021

(65) Prior Publication Data

US 2022/0340395 A1 Oct. 27, 2022

(30) Foreign Application Priority Data

Sep. 20, 2019 (JP) ................................ 2019-171662

(51) Int. Cl.

| | |
|---|---|
| ***B66C 1/10*** | (2006.01) |
| ***B66C 1/62*** | (2006.01) |
| *B66C 23/70* | (2006.01) |

(52) U.S. Cl.
CPC ................ *B66C 1/62* (2013.01); *B66C 23/70* (2013.01)

(58) Field of Classification Search
CPC .............. B66C 1/62; B66C 23/70; B66C 1/66
(Continued)

(56) References Cited

U.S. PATENT DOCUMENTS 3,342,521 A * 9/1967 Renfroe .................... B66C 1/48 294/92
4,075,966 A * 2/1978 Bates .................... F16B 45/015 294/82.35
(Continued)

FOREIGN PATENT DOCUMENTS

EP 2 277 818 A1 1/2011
JP 59-146372 U 9/1984
(Continued)

OTHER PUBLICATIONS

International Search Report mailed on Nov. 20, 2020 in PCT/JP2020/031865 filed on Aug. 24, 2020 (3 pages).
(Continued)

*Primary Examiner* — Paul T Chin
(74) *Attorney, Agent, or Firm* — Oblon, McClelland, Maier & Neustadt, L.L.P.

(57) ABSTRACT

In a work machine suspension device, each of a plurality of retention devices includes a support member that is supported by a first leg portion main body so as to be movable between an entry allowed position and a retention position. The entry allowed position is a position where the support member retracts from a second leg portion main body to allow a retained portion to enter between the first leg portion main body and the second leg portion main body, and the retention position is a position where the retained portion is retained on the support member while the support member
(Continued)

is supported by the first leg portion main body and the second leg portion main body.

19 Claims, 31 Drawing Sheets

(58) Field of Classification Search
USPC ........................ 294/67.1, 67.41, 82.13, 82.17
See application file for complete search history.

(56) References Cited

U.S. PATENT DOCUMENTS

| | | | | | |
|---|---|---|---|---|---|
| 4,417,361 | A * | 11/1983 | Smith | A47K 3/003 4/577.1 |
| 4,733,896 | A * | 3/1988 | Klein | E04G 1/362 294/67.4 |
| 4,826,228 | A * | 5/1989 | Dinitz | B66C 1/12 294/67.1 |
| 5,255,950 | A * | 10/1993 | Davies | B66C 1/48 294/101 |
| 5,782,459 | A * | 7/1998 | Klann | B60S 5/00 254/323 |
| 6,702,132 | B1 | 3/2004 | Moore et al. | |
| 7,159,912 | B2 * | 1/2007 | Gerhausser | B66C 1/12 294/81.2 |
| 8,662,556 | B2 * | 3/2014 | Hagenbuch | B66C 1/66 294/215 |
| 9,004,556 | B2 * | 4/2015 | Gaibler | B66C 1/12 294/82.12 |
| 9,944,502 | B2 * | 4/2018 | Yamashita | B66C 23/62 |
| 10,093,521 | B2 * | 10/2018 | King | B66C 1/16 |
| 2016/0053502 | A1 * | 2/2016 | Phillip | E04G 21/18 254/113 |

FOREIGN PATENT DOCUMENTS

| | | | |
|---|---|---|---|
| JP | 2-188392 | A | 7/1990 |
| JP | 5-85478 | B2 | 12/1993 |
| JP | 6-28545 | Y2 | 8/1994 |
| JP | 3030084 | U | 10/1996 |
| JP | 2005-330042 | A | 12/2005 |
| JP | 2010-173792 | A | 8/2010 |
| JP | 2014-24649 | A | 2/2014 |
| JP | 2018-48014 | A | 3/2018 |
| WO | WO 90/03942 | A1 | 4/1990 |
| WO | WO 2012/151631 | A1 | 11/2012 |

OTHER PUBLICATIONS

Extended European Search Report issued on Sep. 14, 2022 in European Patent Application No. 20866202.3, 8 pages.

* cited by examiner

WORK MACHINE SUSPENSION DEVICE, RETENTION DEVICE, AND METHOD FOR SUSPENDING STRUCTURE MEMBER

TECHNICAL FIELD

The present invention relates to a work machine suspension device for use in assembling and disassembling work for a work machine, to a retention device thereof, and a method for suspending a structure member included in the work machine.

BACKGROUND ART

Conventionally, in assembling and disassembling work for a work machine such as a crane, structure members such as a jib, a boom, and a strut included in the crane are lifted up by an auxiliary crane (accompanying machine) and attached to other parts of the crane. For example, Patent Literature 1 discloses lifting work of lifting up a strut of a crane by an auxiliary crane in order to attach the strut to a distal end portion of a boom (FIG. 2, paragraphs 0024 and 0025 of Patent Literature 1).

In such lifting work, a plurality of slings are used as suspending members. Each of the plurality of slings is made of a wide tape-shaped rope provided with rings at both ends. The structure member includes a plurality of protrusions (suspending rings) for attaching the plurality of slings. Each of the plurality of slings is attached to any one of the plurality of protrusions and a hook of the auxiliary crane by conducting the following attaching work. First, a worker conducting the slinging work hangs both rings of the sling on the hook of the auxiliary crane. This causes the sling to form a loop. Next, the worker hooks a part near a lower end of the loop on the protrusion of the structure member. As a result, the sling is attached to the hook and the protrusion. The worker conducts the above-described attaching work for each of the plurality of slings.

When the attaching work for the plurality of slings is completed, each of the plurality of slings is in a loosened state between the hook and the protrusion. Therefore, an operator who operates the auxiliary crane conducts operation (hook raising operation) for gradually raising the hook of the auxiliary crane so that the plurality of slings change from the loosened state (relaxed state) to a taut state (tensioned state).

However, since the sling is in the relaxed state, the part near the lower end of the loop hooked on the protrusion of the structure member may come off from the protrusion in a raising process of the hook by the hook raising operation. Therefore, the worker who conducts the slinging work needs to conduct assisting work to prevent each of the plurality of slings from coming off the protrusion in the raising process of the hook. In addition, the operator who operates the auxiliary crane needs to carefully conduct the hook raising operation so as to gradually raise the hook in cooperation with the worker so that each of the plurality of slings does not come off the protrusion. Lifting work accompanied by the assisting work and the hook raising operation described above require a lot of labor by the worker who conducts the slinging work, and it takes long time to complete the lifting work. Therefore, it is desired to reduce worker's labor in the lifting work and shorten time required for the lifting work.

CITATION LIST

Patent Literature

Patent Literature 1: JP 2018-048014 A

SUMMARY OF INVENTION

The present invention has been made in view of the above problems, and an object thereof is to provide a work machine suspension device, a retention device, and a method for suspending a structure member which enable reduction in worker's labor in lifting work of lifting up a structure member included in a work machine, and enable reduction in time required for the lifting work.

There is provided a work machine suspension device for conducting lifting work of lifting up a structure member included in a work machine by lifting equipment. The work machine suspension device includes: an attachment part to be attached to the lifting equipment in the lifting work; and a plurality of retention devices supported by the attachment part, in which each of the plurality of retention devices includes: a proximal end portion connected to the attachment part; a first leg portion that is supported by the proximal end portion and includes a first leg portion main body that is disposed below the proximal end portion; a second leg portion that is supported by the proximal end portion and includes a second leg portion main body disposed below the proximal end portion, the second leg portion main body being disposed at an interval in a horizontal direction from the first leg portion main body; and a support member supported by the first leg portion main body so as to be movable between an entry allowed position and a retention position. The entry allowed position is a position where the support member retracts from the second leg portion main body to allow a retained portion as a part of the structure member to enter between the first leg portion main body and the second leg portion main body, and the retention position is a position where the retained portion is retained on the support member while the support member is supported by the first leg portion main body and the second leg portion main body.

There is provided a retention device to be attached to a structure member included in a work machine for conducting lifting work of lifting up the structure member by lifting equipment. The retention device includes: a proximal end portion; a first leg portion that is supported by the proximal end portion and includes a first leg portion main body that is disposed below the proximal end portion; a second leg portion that is supported by the proximal end portion and includes a second leg portion main body disposed below the proximal end portion, the second leg portion main body being disposed at an interval in a horizontal direction from the first leg portion main body; and a support member supported by the first leg portion main body so as to be movable between an entry allowed position and a retention position. The entry allowed position is a position where the support member retracts from the second leg portion main body to allow a retained portion as a part of the structure member to enter between the first leg portion main body and the second leg portion main body, and the retention position is a position where the retained portion is retained on the support member while the support member is supported by the first leg portion main body and the second leg portion main body.

There is provided a method for suspending a structure member by using the work machine suspension device to lift up the structure member, the method including: a step of disposing the support member of each of the plurality of retention devices at the entry allowed position; a step of moving each of the plurality of retention devices downward relative to the corresponding retained portion to cause the corresponding retained portion to enter between the first leg portion main body and the second leg portion main body; a step of moving the support member of each of the plurality of retention devices from the entry allowed position to the retention position; and a step of lifting up the structure member by lifting up the attachment part of the work machine suspension device by the lifting equipment.

DESCRIPTION OF EMBODIMENTS

In the following, work machine suspension devices according to embodiments will be described with reference to the drawings.

First Embodiment

Figure 1:
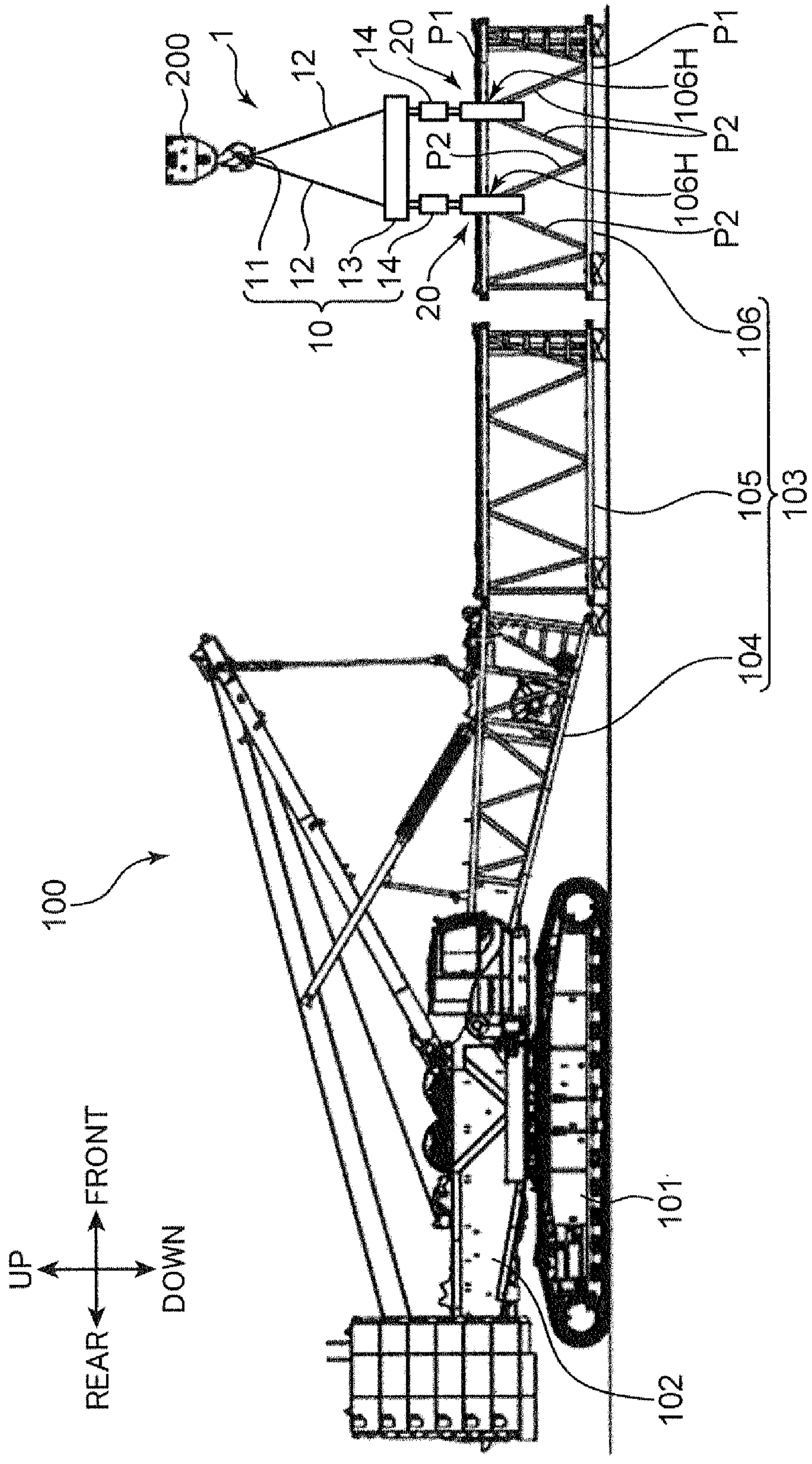
FIG. 1 is a side view showing lifting work for lifting up a structure member of a work machine by using a work machine suspension device according to an embodiment.
Figure 2:
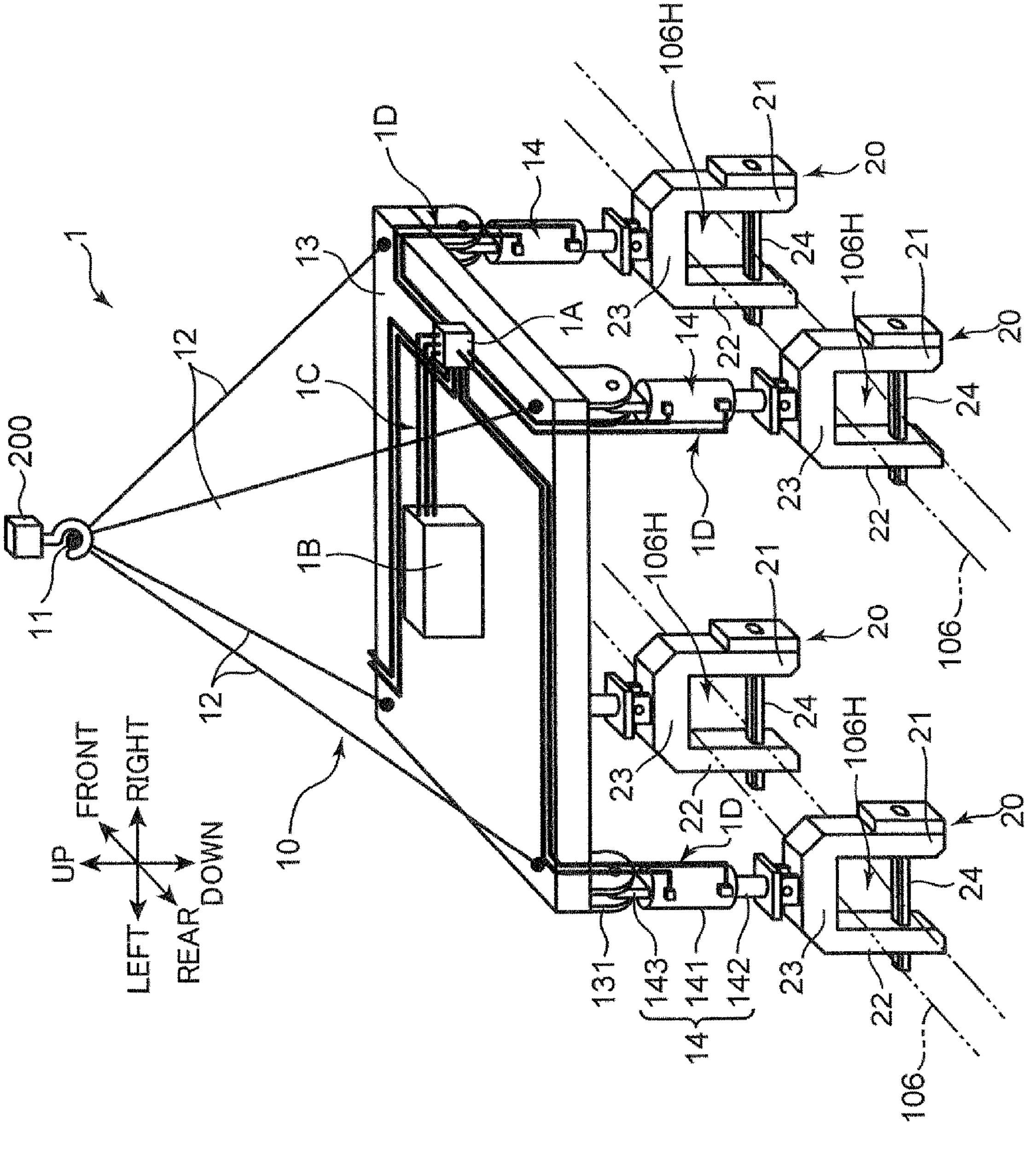
FIG. 2 is a perspective view showing a work machine suspension device according to a first embodiment.
Figure 3:
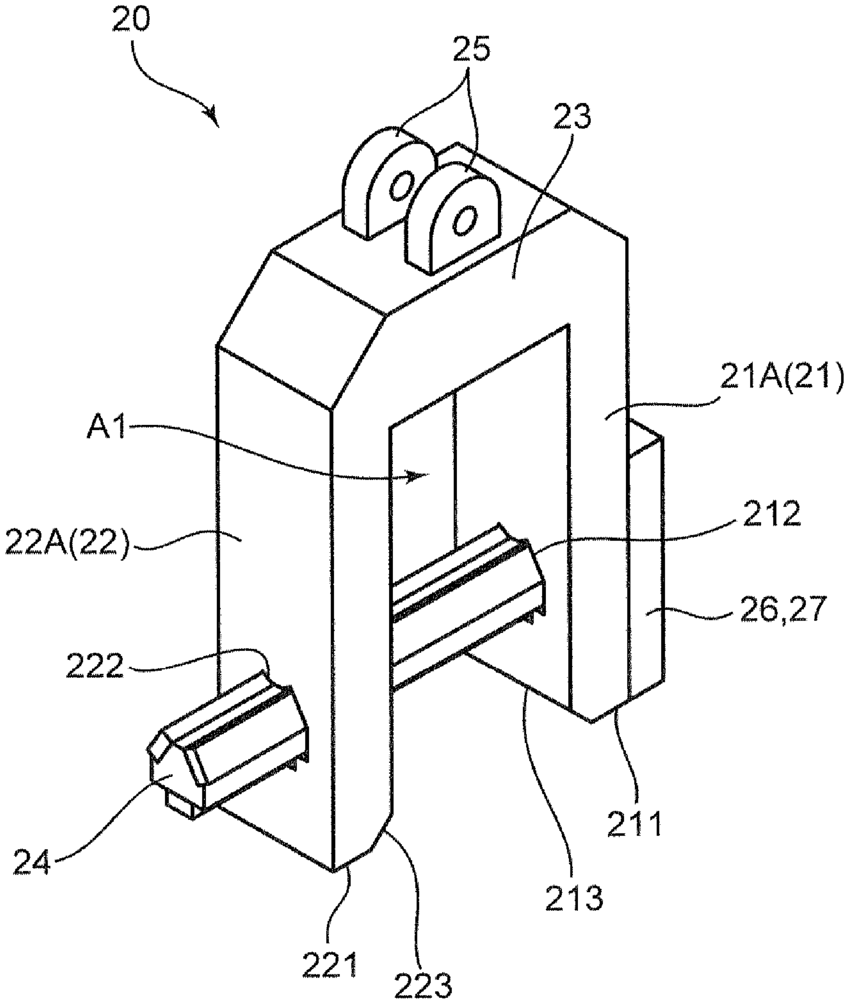
FIG. 3 is a perspective view showing a retention device of the work machine suspension device, the view illustrating a state in which a support member of the retention device is disposed at a retention position.
Figure 4:
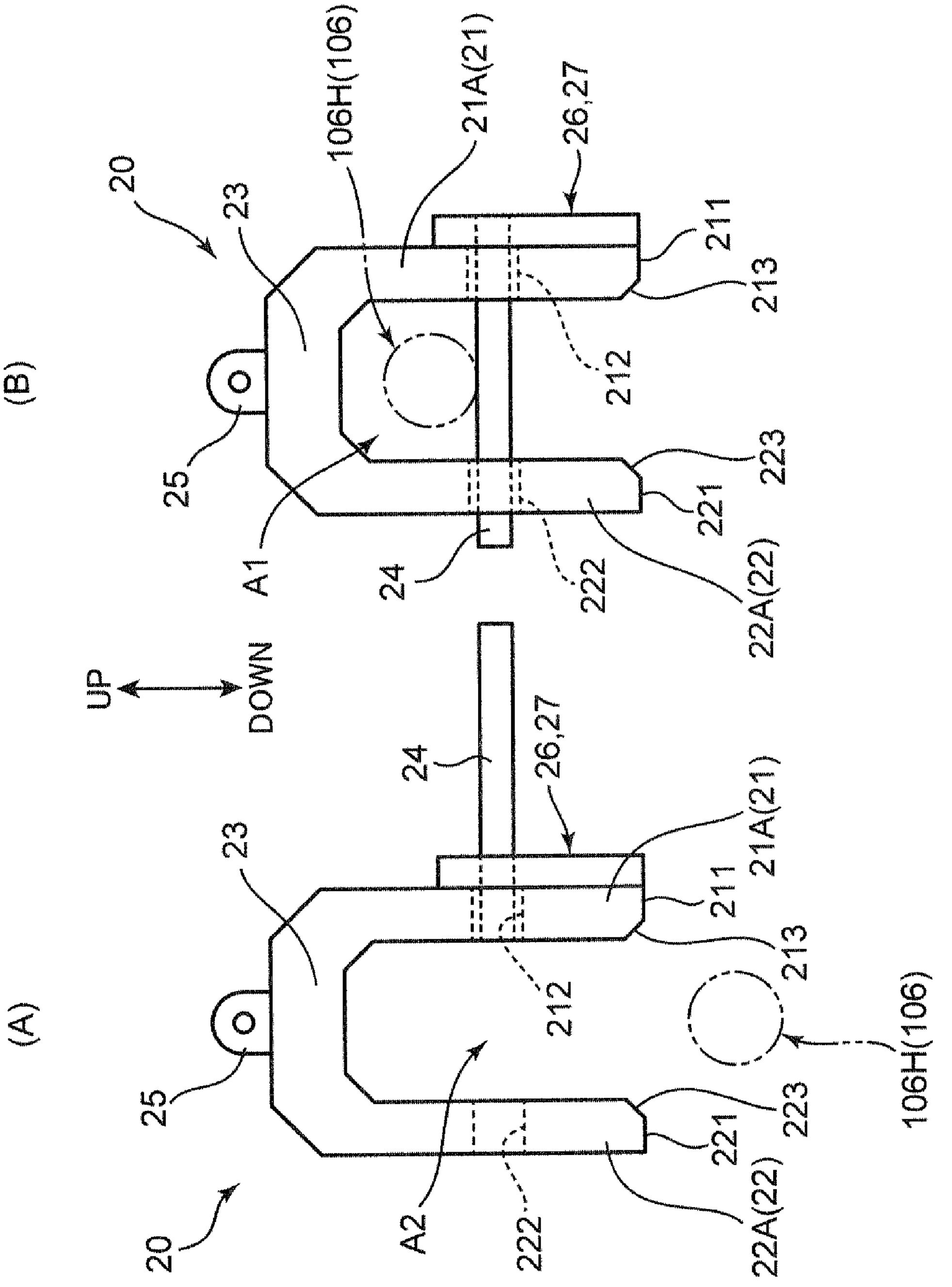
FIG. 4 is a front view showing the retention device of the work machine suspension device, the view being for explaining the retention position and an entry allowed position of the support member of the retention device.
Figure 6:
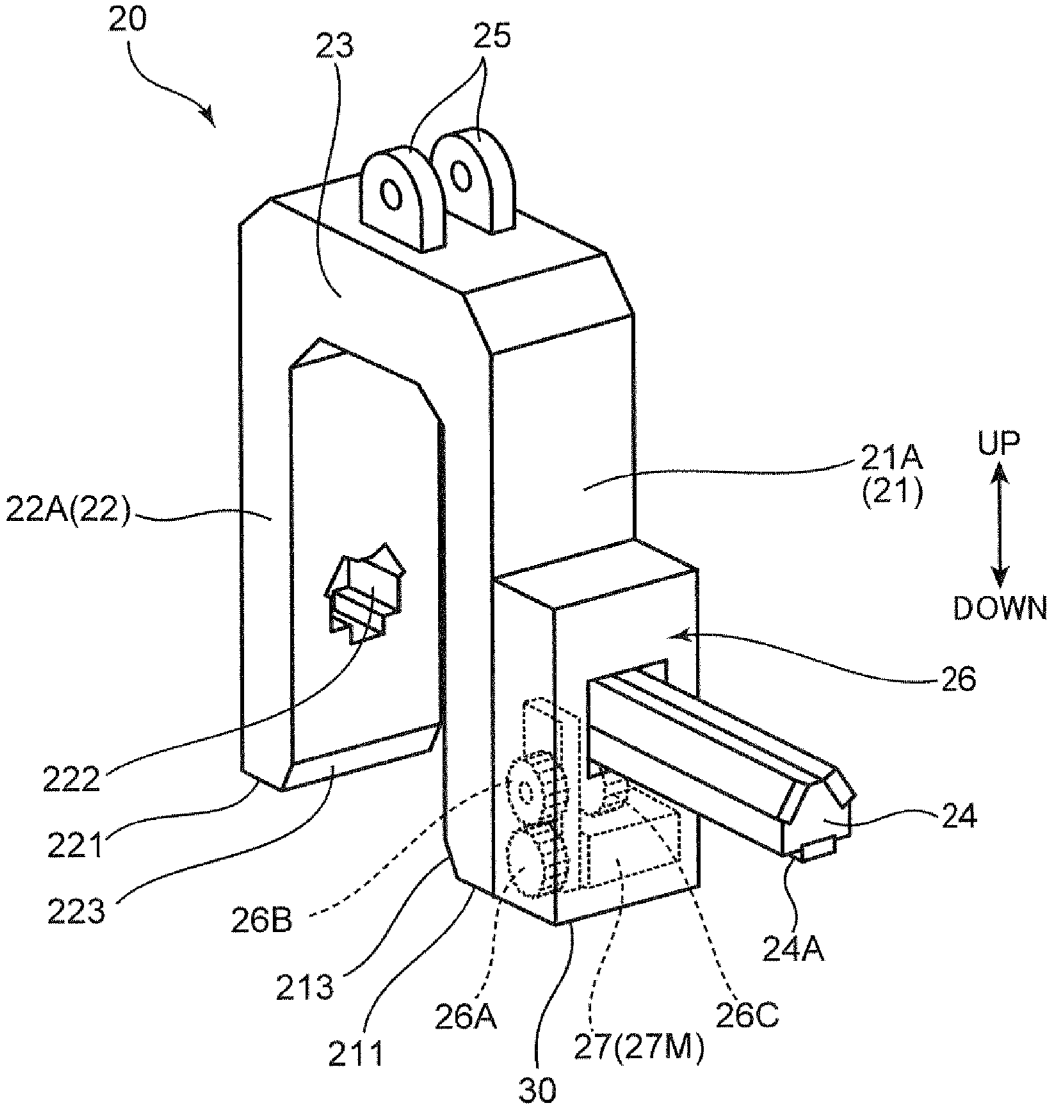
FIG. 6 is a perspective view showing the retention device of the work machine suspension device, the view illustrating a state in which the support member of the retention device is disposed at the entry allowed position.
Figure 7:
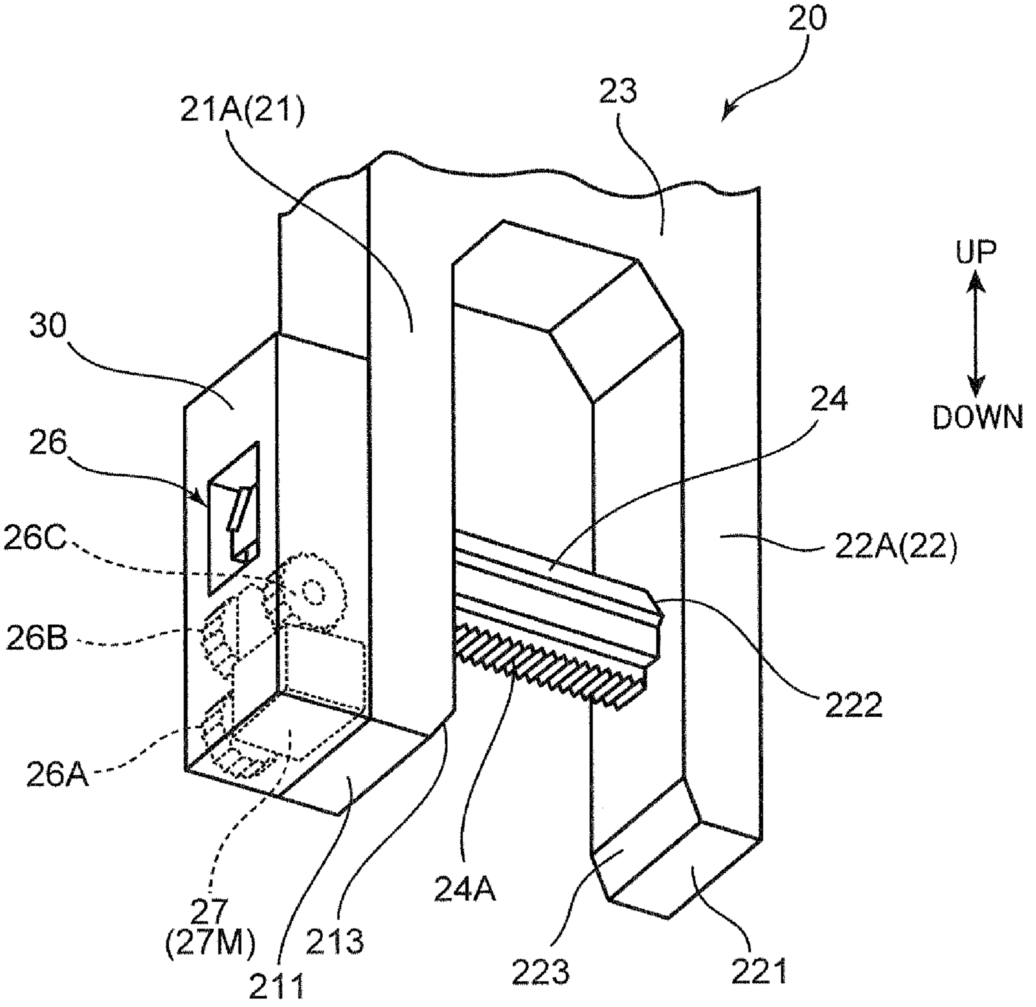
FIG. 7 is a perspective view showing the retention device of the work machine suspension device.

FIG. 1 is a side view showing lifting work for lifting up a structure member included in a crane 100 by using a work machine suspension device 1 according to a first embodiment. FIG. 2 is a perspective view showing the work machine suspension device 1. FIG. 3 is a perspective view showing a retention device 20 of the work machine suspension device 1, the view illustrating a state in which a support member 24 of the retention device 20 is disposed at a retention position. FIG. 4 is a front view showing the retention device 20 of the work machine suspension device 1, the view being for explaining a retention position and an entry allowed position of the support member 24 of the retention device 20. FIG. 6 is a perspective view showing the retention device 20 of the work machine suspension device 1, the view illustrating a state in which the support member 24 of the retention device 20 is disposed at the entry allowed position. FIG. 7 is a perspective view showing the retention device 20 of the work machine suspension device 1. Hereinafter, the work machine suspension device 1 will be simply referred to as a suspension device 1.

"Up", "down", "left", "right", "front" and "rear" directions illustrated in the drawings are indicated for convenience to explain structures of suspension devices 1 according to a plurality of embodiments, and do not limit the structure and usage of the suspension device. In addition, the "up", "down", "left", "right", "front" and "rear" directions shown in the drawings are indicated to correspond to the respective directions seen from a driver's seat of the crane 100.

As shown in FIG. 1, the suspension device 1 is attached to a hook 200 of an auxiliary crane (lifting equipment) not shown, and is used for lifting work for lifting up a structure member included in the crane 100 from the ground. The auxiliary crane is another work machine different from the crane 100 shown in FIG. 1.

The structure member is not particularly limited and may be any member as long as it is included in the crane 100 (an example of a work machine). The structure member may be, for example, a raising and lowering member such as a boom, a jib, or a strut, but is not limited thereto. In a case where the raising and lowering member is configured with a plurality of members, each of the plurality of members is the structure member to be lifted up by the suspension device 1. In the following, description will be made of a case where the structure member is a boom member (specifically, a second intermediate boom member 106 to be described later) included in the boom as an example.

The crane 100 includes a lower traveling body 101, an upper slewing body 102 slewably supported on the lower traveling body 101, and a boom 103. The boom 103 is supported by the upper slewing body 102 so as to be raised and lowered. The boom 103 is configured with a plurality of boom members. The plurality of boom members include a lower boom member 104, a first intermediate boom member 105, the second intermediate boom member 106, and an upper boom member (not shown). The boom 103 is assembled by coupling the plurality of boom members to each other on the ground.

FIG. 1 shows a state where the first intermediate boom member 105 is coupled to the lower boom member 104 attached to the upper slewing body 102, and further, the second intermediate boom member 106 is coupled to the first intermediate boom member 105. As shown in FIG. 1, the suspension device 1 attached to the hook 200 of the auxiliary crane is connected to the second intermediate boom member 106, and the second intermediate boom member 106 is lifted up from the ground. In the following, the second intermediate boom member 106 exemplified as the structure member to be lifted up by the suspension device 1 will be simply referred to as the intermediate boom member 106.

As shown in FIG. 1 and FIG. 2, the suspension device 1 includes an attachment part 10 and four retention devices 20. The attachment part 10 is attached to the hook 200 of the lifting equipment in the lifting work, and is lifted up by the lifting equipment. The attachment part 10 includes a wire suspension portion 11, four suspension wires 12, a base member 13, and four cylinders 14.

The wire suspension portion 11 is attached to the hook 200 of the auxiliary crane. Upper end portions of the four suspension wires 12 are connected to the wire suspension portion 11, and lower end portions of the four suspension wires 12 are connected to the base member 13.

The base member 13 extends along a horizontal direction below the four suspension wires 12, and has a rectangular parallelepiped shape in the present embodiment. As an example, when each member of the boom 103 is lifted up by the suspension device 1, the base member 13 is disposed so that one side of the base member 13 extends in a front-rear direction, and the other side of the base member 13 orthogonal to the one side extends in a right-left direction. The base member 13 is supported by the hook 200 of the auxiliary crane via the wire suspension portion 11 and the four suspension wires 12.

The lower end portions of the four suspension wires 12 are fixed to members provided at the four corners of an upper surface of the base member 13. The four suspension wires 12 connect the wire suspension portion 11 and the base member 13 to each other such that the base member 13 maintains a horizontal attitude in a state where the wire suspension portion 11 is lifted up by the hook 200 of the auxiliary crane. The number of the suspension wires 12 is not limited to four. Further, although in the present embodiment, the base member 13 has a rectangular parallelepiped shape, i.e., a quadrangle shape in a plan view, the present invention is not limited thereto. For the base member 13, various shapes can be adopted such as a shape having a polygon other than a quadrangle in a plan view, a circular shape or an ellipse shape in a plan view, and a combination of these shapes.

Each of the four cylinders 14 is an actuator that is configured with a hydraulic cylinder that expands and contracts upon reception of supply of hydraulic oil, and that operates so as to cause the corresponding retention device 20 to move up and down. Each of the four cylinders 14 has a cylinder main body 141, a cylinder rod 142, and a cylinder bracket 143. The four cylinders 14 are fixed to members provided at the four corners of a lower surface portion of the base member 13. The cylinder bracket 143 is fixed to an upper portion of the cylinder main body 141. The cylinder bracket 143 is rotatably attached to the base bracket 131 of the base member 13. As a result, each of the four cylinders 14 is rotatably supported by the base member 13.

In the present embodiment shown in FIG. 2, the suspension device 1 includes a switching valve 1A, a drive source 1B, a base portion supply path 1C, and four cylinder supply paths 1D. The drive source 1B includes an oil tank (not shown). The switching valve 1A switches supply and shut-off of a hydraulic oil supplied from the drive source 1B such as a hydraulic pump to the four cylinders 14. The base portion supply path 1C is an oil path connecting the switching valve 1A and the drive source 1B. The cylinder supply path 1D is an oil path connecting the switching valve 1A and each cylinder 14. According to such a configuration, each retention device 20 can be moved up and down. This enables height positions of the four retention devices 20 to be adjusted according to a shape and a lifting attitude of the structure member, and enables each retention device 20 to be easily connected to the structure member. As a result, workability of the lifting work can be improved. The cylinder 14 may be an electric cylinder, and in this case, the drive source 1B is configured with a power source.

As shown in FIG. 2, the four retention devices 20 are supported by the four cylinders 14 of the attachment part 10, respectively. The four retention devices 20 are attached to four retained portions 106H of the intermediate boom member 106, respectively. The four retention devices 20 have the same structure. Therefore, one of the four retention devices 20 will be described below.

As shown in FIG. 3 and FIG. 4, the retention device 20 includes a proximal end portion 23 connected to a lower end portion of the cylinder rod 142 of the cylinder 14, a first leg portion 21, a second leg portion 22, the support member 24, a support member moving mechanism 26, and a drive part 27. The proximal end portion 23 has an attachment bracket 25 (attachment part 25).

Although in the present embodiment, the proximal end portion 23 is located in an upper portion of the retention device 20 and has a substantially rectangular parallelepiped shape, the shape is not limited to such a shape. The attachment bracket 25 is located on an upper portion of the proximal end portion 23 and is rotatably attached to the lower end portion of the cylinder rod 142.

Figure 27:
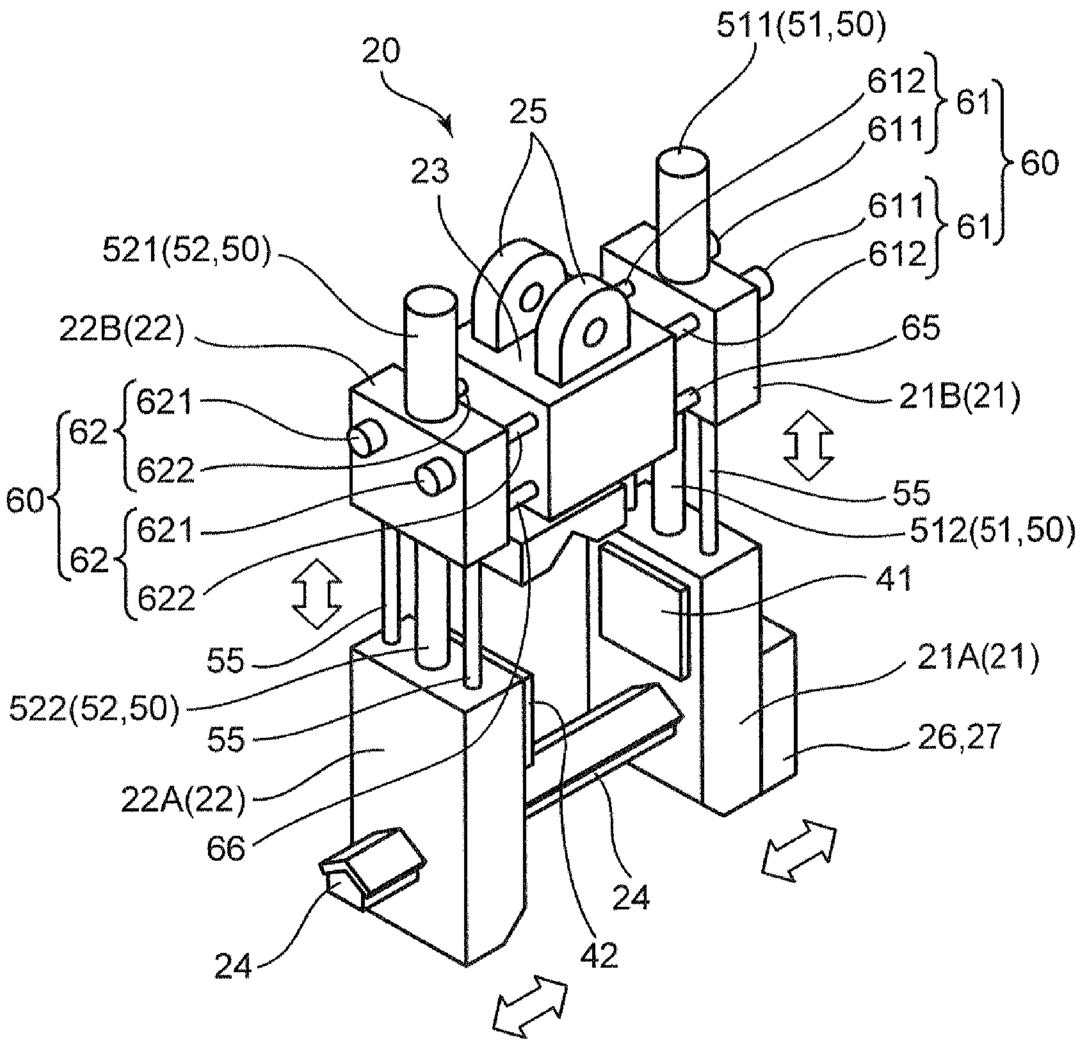
FIG. 27 is a perspective view showing a retention device of a work machine suspension device according to a third embodiment.

The first leg portion 21 extends downward from one end portion in a horizontal direction of the proximal end portion 23 and is supported by the proximal end portion 23. The first leg portion 21 includes a first leg portion main body 21A disposed below the proximal end portion 23. In the present embodiment, the first leg portion 21 is configured with only the first leg portion main body 21A because the entire first leg portion 21 is located below the proximal end portion 23. The first leg portion 21 may include not only the first leg portion main body 21A but also other member, for example, as in a third embodiment to be described later which is shown in FIG. 27.

The second leg portion 22 extends downward from the other end portion in the horizontal direction of the proximal end portion 23 and is supported by the proximal end portion 23. The second leg portion 22 is disposed at an interval in the horizontal direction from the first leg portion 21. The second leg portion 22 includes a second leg portion main body 22A disposed below the proximal end portion 23. In the present embodiment, the second leg portion 22 is configured with only the second leg portion main body 22A because the entire second leg portion 22 is located below the proximal end portion 23. The second leg portion 22 may include not only the second leg portion main body 22A but also other member, for example, as in the third embodiment to be described later which is shown in FIG. 27.

As shown in FIG. 3 to FIG. 7, a first lower end portion of the first leg portion 21 and a second lower end portion of the second leg portion 22 have such a first inclined surface 213 and a second inclined surface 223, respectively, that makes a distance between the lower end portions increases downward. At the time of relative displacement of the retained portion 106H in an up-down direction with respect to the retention device 20, the retained portion 106H can be guided by one or both of the first inclined surface 213 and the second inclined surface 223 so as to relatively move. This enables the retained portion 106H to smoothly enter between the first leg portion main body 21A and the second leg portion main body 22A.

Of the first leg portion 21, the first lower end portion may be integrally molded with a portion other than the first lower end portion, and may be configured to be removable from a portion other than the first lower end portion. Similarly, of the second leg portion 22, the second lower end portion may be integrally molded with a portion other than the second lower end portion, and may be configured to be removable from a portion other than the second lower end portion.

Further, although in the present embodiment, the proximal end portion 23, the first leg portion 21, and the second leg portion 22 are integrally molded, the present invention is not limited thereto. After each of the proximal end portion 23, the first leg portion 21, and the second leg portion 22 is individually molded, these members may be coupled to each other.

As shown in FIG. 3 and FIG. 4, the support member 24 is supported by the first leg portion main body 21A so as to be movable between the entry allowed position and the retention position.

As shown in FIG. 4(A), the entry allowed position is a position where the support member 24 retracts from the second leg portion main body 22A to allow the retained portion 106H of the intermediate boom member 106 to enter between the first leg portion main body 21A and the second leg portion main body 22A. Specifically, in the present embodiment, when the support member 24 is disposed at the entry allowed position, the plurality of retention devices 20 are moved downward to cause the corresponding retained portion 106H to enter between the first leg portion main body 21A and the second leg portion main body 22A of each retention device 20.

As shown in FIG. 3 and FIG. 4(B), the retention position is a position where the retained portion 106H of the intermediate boom member 106 can be retained on the support member 24 while the support member 24 is supported by the first leg portion main body 21A and the second leg portion main body 22A.

At the retention position, the support member 24 straddles between the first leg portion main body 21A and the second leg portion main body 22A to couple the first leg portion main body 21A and the second leg portion main body 22A. When the support member 24 is disposed at the retention position, the proximal end portion 23, the first leg portion main body 21A, the second leg portion main body 22A, and the support member 24 form a housing portion A1 in which the retained portion 106H is housed. The housing portion. A1 is a region surrounded by the proximal end portion 23, the first leg portion main body 21A, the second leg portion main body 22A, and the support member 24.

When the support member 24 is disposed at the retention position, the retained portion 106H retained on the support member 24 is prevented from moving downward relative to the support member 24, and is retained in the housing portion A1.

When the support member 24 goes away from the second leg portion main body 22A to be disposed at the entry allowed position, an entry path A2 for the retained portion 106H to enter the housing portion A1 is formed between the support member 24 and the second leg portion main body 22A. The entry path A2 is a region between the support member 24 and the second leg portion main body 22A.

In the present embodiment, the first leg portion main body 21A has a first through hole 212 that horizontally penetrates the first leg portion main body 21A, and the second leg portion main body 22A has a second through hole 222 that horizontally penetrates the second leg portion main body 22A. As shown in FIG. 4(A) and FIG. 4(B), the support member 24 is supported by the first leg portion main body 21A at both the entry allowed position and the retention position because of being inserted into the first through hole 212 at both positions. When the support member 24 moves from the entry allowed position to the retention position, an end portion of the support member 24 is inserted into the second through hole 222, so that the support member is supported by the first leg portion main body 21A and the second leg portion main body 22A.

Although in the present embodiment, a movement direction of the support member 24 is the horizontal direction, the direction is not limited thereto and may be a direction inclined with respect to the horizontal direction.

In the present embodiment, when the support member 24 is disposed at the entry allowed position, the support member 24 is not disposed between the first leg portion main body 21A and the second leg portion main body 22A. As a result, when the retained portion 106H relatively moves with respect to the retention device 20 from an opening between a lower end 211 of the first leg portion main body 21A and a lower end 221 of the second leg portion main body 22A toward the housing portion A1, the support member 24 does not interfere with the movement of the retained portion 106H. However, when the support member 24 is disposed at the entry allowed position, a portion including the end portion (distal end portion) of the support member 24 may be disposed between the first leg portion main body 21A and the second leg portion main, body 22A. In this case, a distance (a distance in the horizontal direction) between the distal end portion of the support member 24 disposed between the first leg portion main body 21A and the second leg portion main body 22A and the second leg portion main body 22A is set to a size that allows the retained portion 106H to pass in the up-down direction between the distal end portion of the support member 24 and the second leg portion main body 22A. Further, in this case, the distal end portion of the support member 24 preferably has such an inclined surface that makes the distance in the horizontal direction between the distal end portion and the second leg portion main body 22A increase downward. This enables the retained portion 106H to smoothly enter between the first leg portion main body 21A and the second leg portion main body 22A while being guided by the inclined surface of the support member 24.

Figure 5:
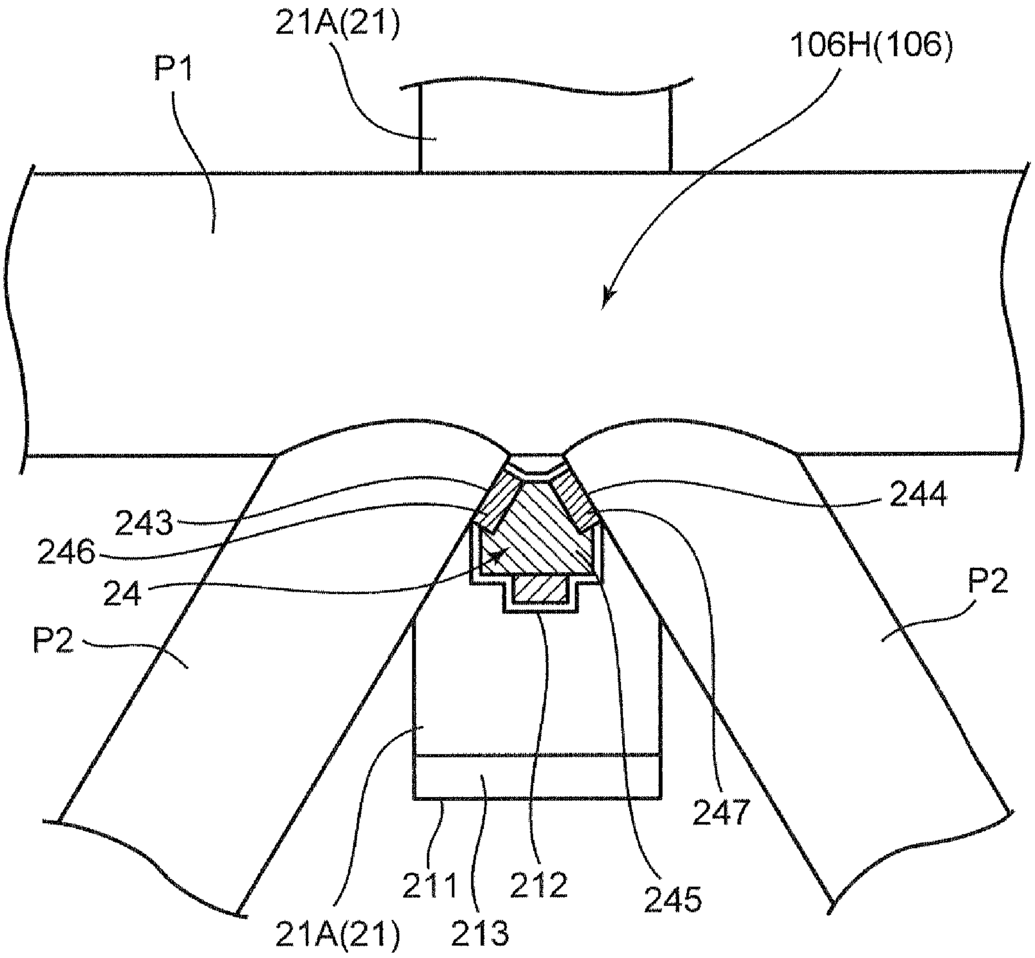
FIG. 5 is a cross-sectional view showing a positional relationship between the support member of the retention device of the work machine suspension device and a retained portion.

As shown in FIG. 1 and FIG. 5, the retained portion 106H of the intermediate boom member 106 to which the retention device 20 is attached is a connection part at which a pair of inclined pipes P2, P2 are connected to a main pipe P1 in the intermediate boom member 106. In this embodiment, the intermediate boom member 106 has a lattice structure. Specifically, the intermediate boom member 106 includes four main pipes P1 and the plurality of inclined pipes P2. Each of the four main pipes P1 is disposed along a longitudinal direction of the boom 103. Each of the plurality of inclined pipes P2 connects two adjacent main pipes P1 to each other. As shown in FIG. 5, among the plurality of inclined pipes P2, upper end portions of two adjacent inclined pipes P2, P2 are connected to one main pipe P1 so as to be adjacent to each other. Of the two inclined pipes P2, P2, the inclined pipe P2 on the front side is inclined so as to have a lower end portion located in front of the upper end portion, and the inclined pipe P2 on the rear side has a lower end portion located behind the upper end portion.

As shown in FIG. 5, the support member 24 has a shape corresponding to a shape of a lower portion of the retained portion 106H that is retained on the support member 24. Specifically, the support member 24 has a pair of inclined surfaces 243 and 244 (an example of a contact surface) inclined along surfaces of the two inclined pipes P2, P2 in the retained portion 106H. The pair of inclined surfaces 243 and 244 are formed in an upper portion of the support member 24. As shown in FIG. 5, when the support member 24 is viewed in a longitudinal direction thereof, one inclined surface 243 (the inclined surface on the left side in FIG. 5) is inclined in the same direction as the surface of one inclined pipe P2 (the inclined pipe on the left side in FIG. 5) with respect to a vertical direction, and the other inclined surface 244 (the inclined surface on the right side in FIG. 5) is inclined in the same direction as the surface of the other inclined pipe P2 (the inclined pipe on the right side in FIG. 5) with respect to the vertical direction. The pair of inclined surfaces 243 and 244 are in contact with the surfaces of the two inclined pipes P2, P2 in the retained portion 106H. Since the support member 24 only needs to be capable of retaining the retained portion 106H, it does not necessarily have to have the pair of inclined surfaces 243 and 244 as shown in FIG. 5, and one or both of the inclined surfaces 243 and 244 can be omitted.

The support member 24 includes a rigid member main body 245 made of metal, for example, steel, and a pair of cushioning members 246 and 247 attached to the member main body 245. The pair of inclined surfaces 243 and 244 form surfaces of the pair of cushioning members 246 and 247, respectively. The pair of cushioning members 246 and 247 are formed of a material having hardness lower than that of the member main body 245. This suppresses the retained portion 106H of the intermediate boom member 106 from being scratched. The pair of cushioning members 246 and 247 preferably have cushioning properties. The pair of cushioning members 246 and 247 preferably have a frictional resistance that makes them less slippery with respect to a surface of the retained portion 106H. It is also possible to omit one or both of the pair of cushioning members 246 and 247.

The support member moving mechanism 26 operates so as to move the support member 24 between the entry allowed position and the retention position. The drive part 27 drives the support member moving mechanism 26.

As shown in FIG. 6 and FIG. 7, in the present embodiment, the drive part 27 is configured with an electric motor 27M, and the support member moving mechanism 26 is configured with a mechanism having a plurality of gears rotated by the electric motor 27M. The electric motor 27M and the plurality of gears are housed in a case 30, and the case 30 is attached to a side surface of the first leg portion main body 21A. The drive part 27 is not limited to the electric motor 27M, and may be configured by other drive mechanism such as a hydraulic motor.

The plurality of gears include a first gear 26A, a second gear 26B, and a third gear 26C. The first gear 26A is connected to a rotation shaft of the electric motor 27M to rotate with rotation of the electric motor 27M. The second gear 26B circumscribes the first gear 26A and rotates with rotation of the first gear 26A. The third gear 26C is disposed at a position deviated from the second gear 26B in an axial direction of a rotation shaft thereof and is connected to the rotation shaft of the second gear 26B to rotate with rotation of the second gear 26B.

A rack portion 24A that meshes with the third gear 26C is formed on a surface of the support member 24 (a lower surface of the support member 24 in FIG. 7). The rack portion 24A is a part in which a plurality of teeth are formed on a flat lower surface of the support member 24. Therefore, a rotational force of the electric motor 27M is transmitted to the first gear 26A, the second gear 26B, and the third gear 26C in this order, and is converted into a linear movement of the rack portion 24A. In other words, since the support member 24 is allowed to move in a direction corresponding to a rotation direction of the electric motor 27M, the support member can move between the retention position and the entry allowed position.

The support member moving mechanism 26 is not limited to a mechanism having a plurality of gears, and may be configured by a mechanism having only a single gear. In this case, for example, the drive part 27 such as the electric motor 27M directly causes a single gear (for example, the third gear 26C) to rotate, and a rotational force of the single gear is converted into a linear movement of the rack portion 24A that meshes with the single gear.

Figure 12:
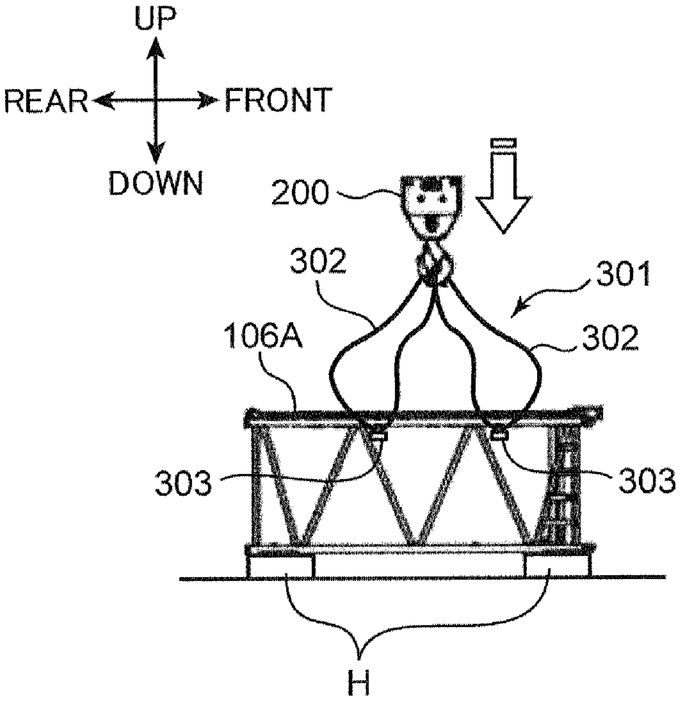
FIG. 12 is a view showing lifting work for lifting up a structure member using a work machine suspension device according to a reference example.
Figure 13:
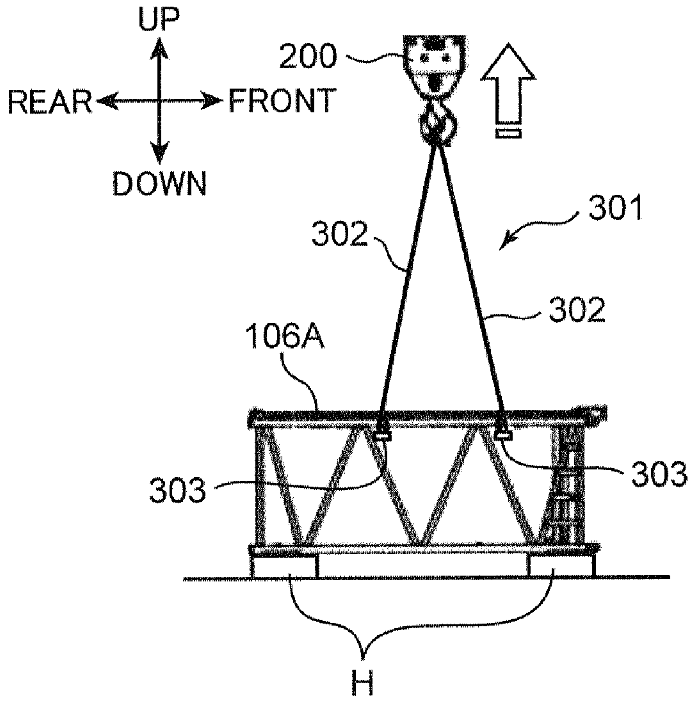
FIG. 13 is a view showing the lifting work for lifting up the structure member using the work machine suspension device according to the reference example.

FIG. 8, FIG. 9, FIG. 10 and FIG. 11 are views showing lifting work for lifting up the intermediate boom member 106 using the suspension device 1. FIG. 12 and FIG. 13 are views showing lifting work for lifting up a structure member using a suspension device 301 according to a reference example.

Figure 14:
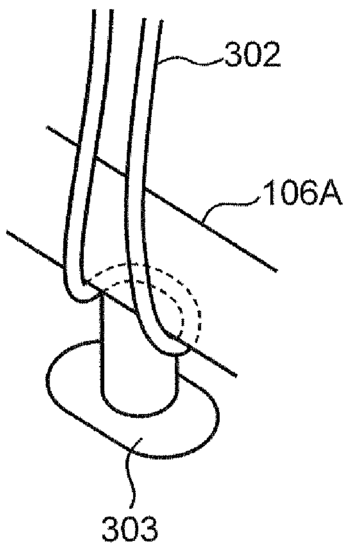
FIG. 14 is an enlarged perspective view showing a state in which a sling of the work machine suspension device according to the reference example is attached to a protrusion of the structure member.
Figure 15:
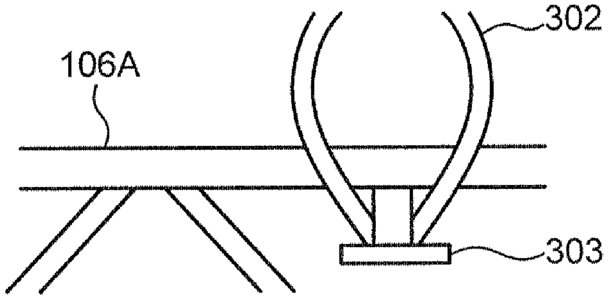
FIG. 15 is an enlarged side view showing a state in which the sling of the work machine suspension device according to the reference example is attached to the protrusion of the structure member.
Figure 16:
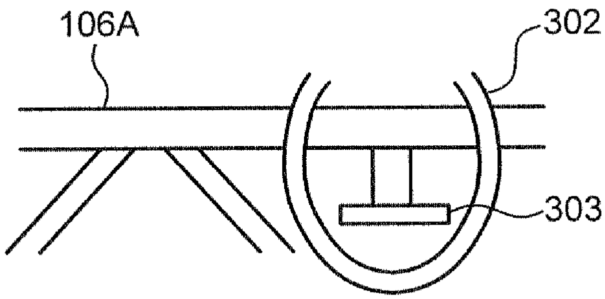
FIG. 16 is an enlarged side view showing a state in which the sling of the work machine suspension device according to the reference example is detached from the protrusion of the structure member.

FIG. 14 is an enlarged perspective view showing a state in which a sling 302 of the suspension device 301 according to the reference example is attached to a protrusion 303 of an intermediate boom member 106A, and FIG. 15 is a side view showing the state. FIG. 16 is an enlarged side view showing a state in which the sling 302 of the suspension device 301 according to the reference example is disengaged from the protrusion 303 of the intermediate boom member 106A.

First, the suspension device according to the reference example and a suspending method using the same will be briefly described. As shown in FIG. 12 and FIG. 13, the suspension device 301 according to the reference example is configured with a plurality of the slings 302. The intermediate boom member 106A includes a plurality of the protrusions 303 (suspending rings) for attaching the plurality of slings 302. A worker conducting slinging work hangs both rings of the sling 302 on the hook 200 of the auxiliary crane. As a result, the sling 302 forms a loop. Next, the worker hooks a portion near a lower end of the loop on the protrusion 303 of the intermediate boom member 106A. As a result, the sling 302 is attached to the hook 200 and the protrusion. 303. The worker conducts the above-described attaching work for each of the plurality of slings 302.

As shown in FIG. 12, at the time when the attaching work for the plurality of slings 302 is completed, each of the plurality of slings 302 is in a loosened state between the hook 200 and the protrusion 303. Therefore, the operator who operates the auxiliary crane conducts operation (hook raising operation) for gradually raising the hook 200 of the auxiliary crane so as to have a state change from a state where the plurality of slings 302 are loosened (relaxed state) as shown in FIG. 12 to a state where the plurality of slings 302 are taut (tensioned state) as shown in FIG. 13.

Since as shown in FIG. 14 and FIG. 15, the sling 302 is in the relaxed state, the portion near the lower end of the loop hooked on the protrusion 303 of the intermediate boom member 106A might come off the protrusion 303 in the raising process of the hook 200 by the hook raising operation as shown in FIG. 16. Accordingly, the worker who conducts the slinging work needs to conduct assisting work so that each of the plurality of slings 302 does not come off the protrusion 303 in the raising process of the hook 200. Further, in cooperation with the worker, the operator who operates the auxiliary crane needs to carefully conduct the hook raising operation to cause the hook 200 gradually to rise such that each of the plurality of slings 302 does not come off the protrusion 303.

Meanwhile, the suspending method according to the present embodiment is conducted by the following procedure.

Figure 8:
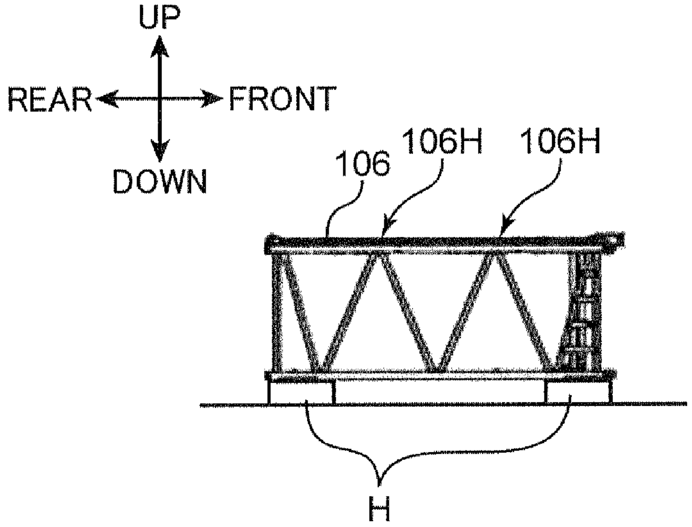
FIG. 8 is a view showing lifting work for lifting up the structure member using the work machine suspension device.

As shown in FIG. 8, first, the intermediate boom member 106 is prepared. The prepared intermediate boom member 106 is disposed, for example, on a plurality of bases H.

Next, by conducting operation for causing the electric motor 27M to operate by the worker conducting the slinging work or the operator operating the auxiliary crane, the support member 24 of each of the plurality of retention devices 20 is disposed at the entry allowed position.

Figure 9:
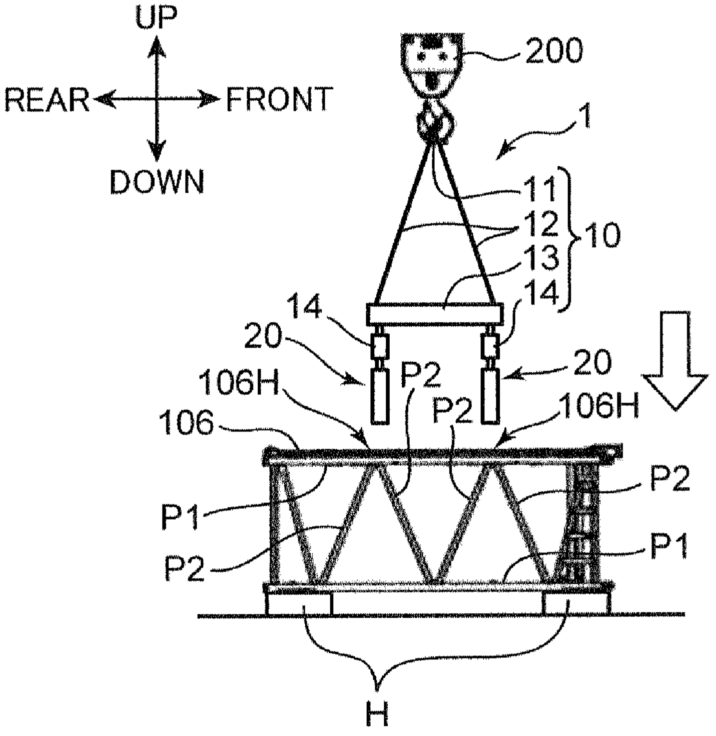
FIG. 9 is a view showing the lifting work for lifting up the structure member using the work machine suspension device.
Figure 10:
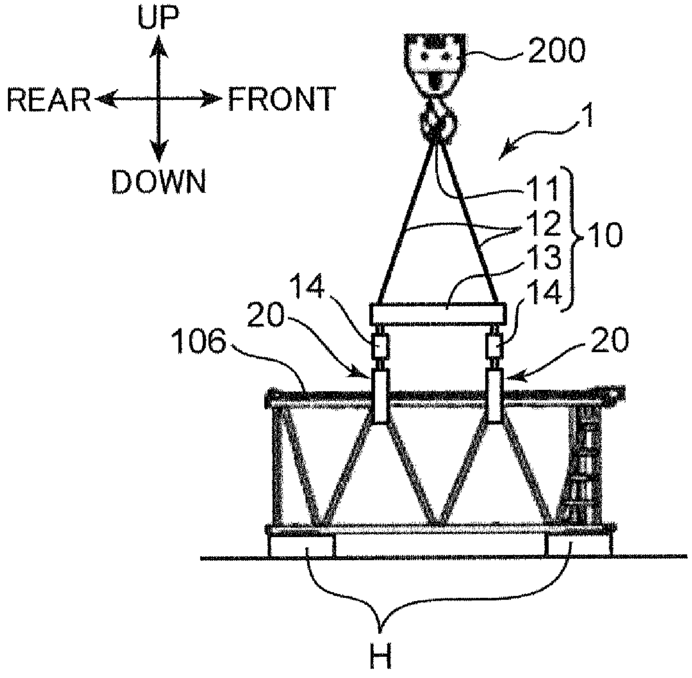
FIG. 10 is a view showing the lifting work for lifting up the structure member using the work machine suspension device.

Next, as shown in FIG. 9, the operator of the auxiliary crane moves the suspension device 1 downward by conducting operation of lowering the hook 200 of the auxiliary crane. As a result, the plurality of retention devices 20 move downward, and as shown in FIG. 10, between the first leg portion main body 21A and the second leg portion main body 22A of each retention device 20, the corresponding retained portion 106H enters.

Next, the support member 24 of each of the plurality of retention devices 20 is disposed at the retention position by the operation for causing the electric motor 27M to operate by the worker conducting the slinging work or the operator operating the auxiliary crane. The retention device 20 is attached to the intermediate boom member 106 so that the support member 24 is located between the two inclined pipes P2, P2. This suppresses the retention device 20 from being displaced in the front-rear direction with respect to the intermediate boom member 106.

Figure 11:
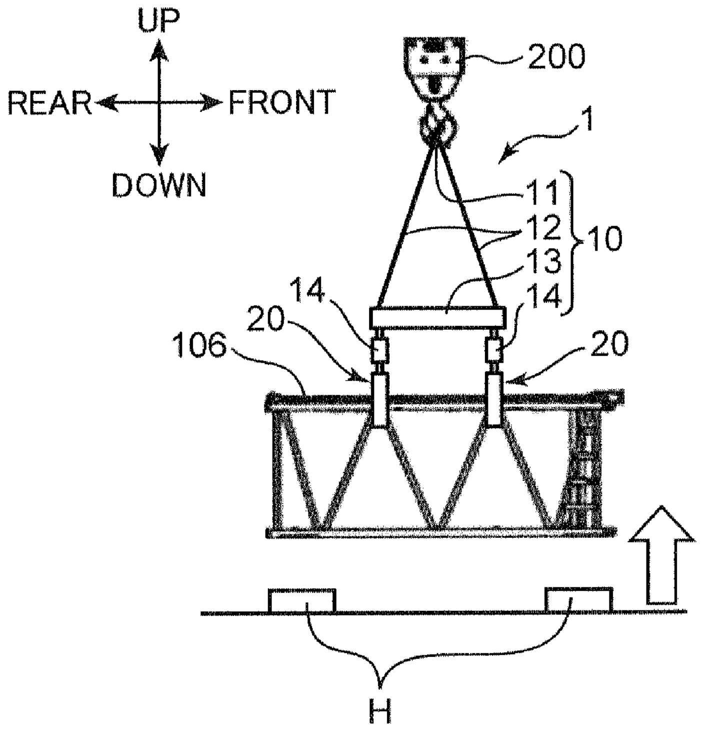
FIG. 11 is a view showing the lifting work for lifting up the structure member using the work machine suspension device.

Next, as shown in FIG. 11, the operator moves the suspension device 1 upward by conducting operation of raising the hook 200 of the auxiliary crane. As a result, the plurality of retention devices 20 move upward, and the intermediate boom member 106 is lifted up.

As described above, in the present embodiment, each of the plurality of retention devices 20 moves downward relative to the retained portion 106H in a state where the support member 24 is disposed at the entry allowed position, whereby the retained portion 106H enters between the first leg portion main body 21A and the second leg portion main body 22A. Then, with the retained portion 106H disposed in the housing portion A1, the support member 24 of each of the plurality f retention devices 20 moves from the entry allowed position to the retention position. As a result, the retained portion 106H is retained on the support member 24, whereby the retained portion 106H is prevented from moving downward relative to the support member 24, so that the retained portion 106H is retained in the housing portion A1. Retaining the retained portion 106H in this way makes it possible to simplify or omit the assisting work by the worker in the raising process of the hook 200 by the hook raising operation, and also enables the operator to quickly conduct the hook raising operation.

[Modification of First Embodiment]

Figure 17:
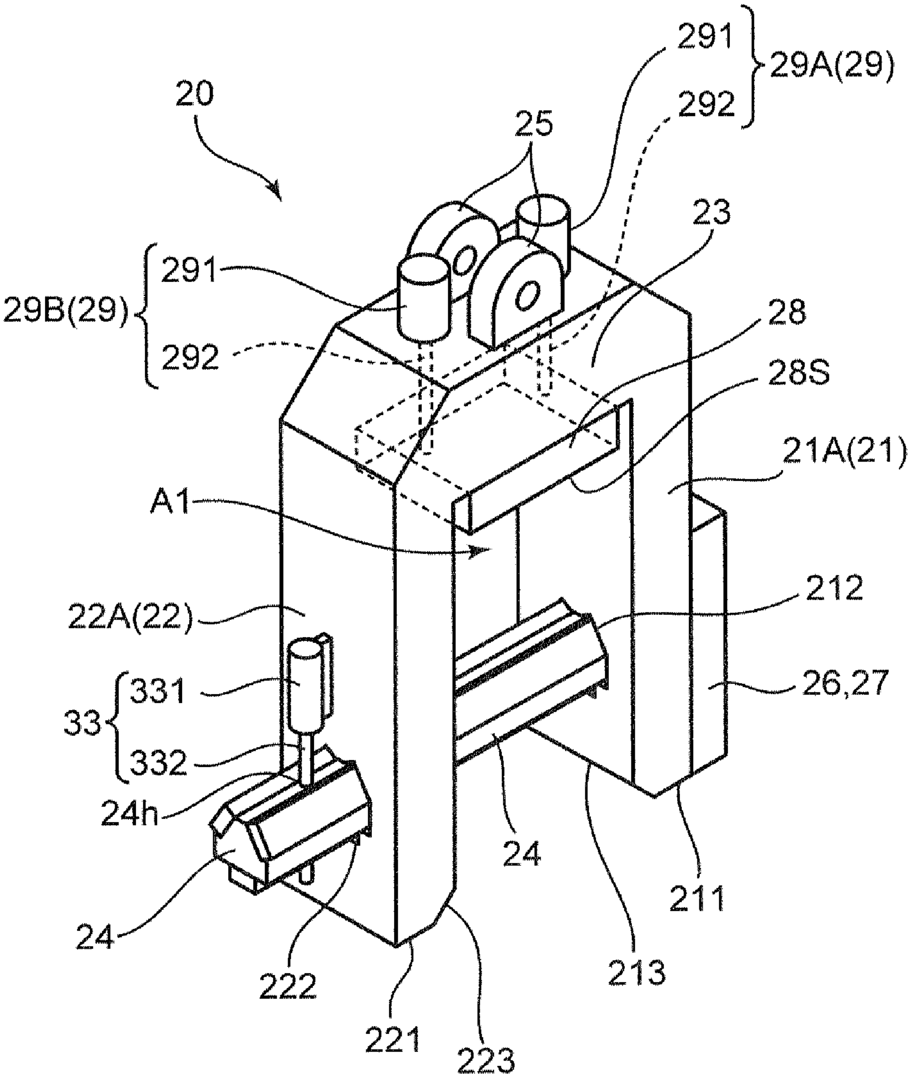
FIG. 17 is a perspective view showing a retention device of a suspension device according to a first modification of the first embodiment.

FIG. 17 is a perspective view showing a retention device of a suspension device 1 according to a first modification of the first embodiment. As shown in FIG. 17, in the first modification, each of the plurality of retention devices 20 further includes an upper pressing member 28, an upper pressing member moving mechanism 29, and a restricting portion.

The upper pressing member 28 is interposed between the proximal end portion 23 and the support member 24. The upper pressing member 28 has an opposing surface 28S opposed to an upper portion of the retained portion 106H disposed in the housing portion A1 and retained on the support member 24. The opposing surface 28S is configured with a lower surface of the upper pressing member 28. In the first modification, the opposing surface 28S is formed of a flat surface. Specifically, the opposing surface 28S is formed of a horizontal plane.

In this first modification, even in a case where a relatively large gap is formed between the retained portion 106H and the proximal end portion 23 due to a relatively large difference between a distance in the up-down direction between the proximal end portion 23 and the support member 24 and a dimension in the up-down direction of the retained portion 106H, the gap is reduced by the upper pressing member 28 interposed between the proximal end portion 23 and the support member 24. This enables rattling of the retained portion 106H that is retained on the support member 24 to be suppressed.

The upper pressing member 28 is preferably formed of a material having hardness lower than that of the proximal end portion 23. This suppresses the retained portion 106H of the intermediate boom member 106 from being scratched. The upper pressing member 28 more preferably has a cushioning property.

In the present embodiment, the upper pressing member 28 is supported by the proximal end portion 23 via the upper pressing member moving mechanism 29.

The upper pressing member moving mechanism 29 is configured with a pair of cylinders 29A and 29B that operate so as to move the upper pressing member 28 relative to the proximal end portion 23 in the up-down direction. Each of the pair of cylinders 29A and 29B has a cylinder main body 291 and a cylinder rod 292. The cylinder main body 291 is fixed to the proximal end portion 23. The cylinder rod 292 is configured to be movable in the up-down direction relative to the cylinder main body 291. The cylinder rod 292 is inserted into a through hole that penetrates the proximal end portion 23 in the up-down direction, and a lower end portion of the cylinder rod 292 is located below the proximal end portion 23 and is fixed to the upper pressing member 28.

Each of the pair of cylinders 29A and 29B is operated by, for example, hydraulic oil supplied from the drive source 1B shown in FIG. 2 via an oil passage (not shown). A switching valve (not shown) is disposed in the oil passage. When the switching valve is set at a neutral position, the hydraulic oil from the drive source 1B is not supplied to the pair of cylinders 29A and 29B. When the switching valve is switched from the neutral position to a first position and the hydraulic oil is supplied to a head side chamber of each of the pair of cylinders 29A and 29B, a dimension of the cylinder rod 292 protruding downward from the cylinder main body 291 becomes large. As a result, the upper pressing member 28 is lowered. By contrast, when the switching valve is switched from the neutral position to a second position and the hydraulic oil is supplied to a rod side chamber of each of the pair of cylinders 29A and 29B, the dimension of the cylinder rod 292 protruding downward from the cylinder main body 291 becomes small. As a result, the upper pressing member 28 rises. The pair of cylinders 29A and 29B may be electric cylinders, and in this case, the drive source 1B is configured with a power source. Further, the upper pressing member moving mechanism 29 is not limited to a configuration including the pair of cylinders 29A and 29B, and may be configured by a single cylinder or may be configured by three or more cylinders.

The restricting portion is configured to be switched between a restriction state of restricting movement of the support member 24 from the retention position and an allowable state of allowing the support member 24 to move from the retention position to the entry allowed position. In the present embodiment, the restricting portion is configured with a cylinder 33. The cylinder 33 has a cylinder main body 331 and a cylinder rod 332.

Although in the present embodiment, the cylinder main body 331 is fixed to the second leg portion 22, it may be fixed, for example, to the first leg portion 21 or fixed to the proximal end portion 23. The cylinder rod 332 is configured to be movable in the up-down direction relative to the cylinder main body 331.

The cylinder 33 is operated by, for example, hydraulic oil supplied from the drive source 1B shown in FIG. 2 via an oil passage (not shown). A switching valve (not shown) is disposed in the oil passage. When the switching valve is set at a neutral position, the hydraulic oil from the drive source 1B is not supplied to the cylinder 33.

When the switching valve is switched from the neutral position to a first position and the hydraulic oil is supplied to a head side chamber of the cylinder 33, a dimension of the cylinder rod 332 protruding downward from the cylinder main body 331 becomes large. As a result, as a lower end portion of the cylinder rod 332 is inserted into a through hole 24*h* that penetrates the end portion of the support member 24 in the up-down direction (the restriction state). Upon switching of the cylinder 33 to the restriction state, it is possible to reliably prevent the support member 24 from moving from the retention position to the entry allowed position against an intention of work-related personnel such as the worker or the operator when the intermediate boom member 106 is lifted up in the lifting work. The through hole 24*h* is formed at a position corresponding to the cylinder rod 332 when the support member 24 is disposed at the retention position, that is, directly below the cylinder rod 332.

By contrast, when the switching valve is switched from the neutral position to a second position and the hydraulic oil is supplied to a rod side chamber of the cylinder 33, the dimension of the cylinder rod 332 protruding from the cylinder main body 331 becomes small. As a result, the lower end portion of the cylinder rod 332 is retracted from the support member 24 (the allowable state). When the cylinder 33 is switched to the allowable state, the support member 24 is allowed to move from the retention position to the entry allowed position. The cylinder 33 may be an electric cylinder, and in this case, the drive source 1B is configured with a power source.

Figure 18:
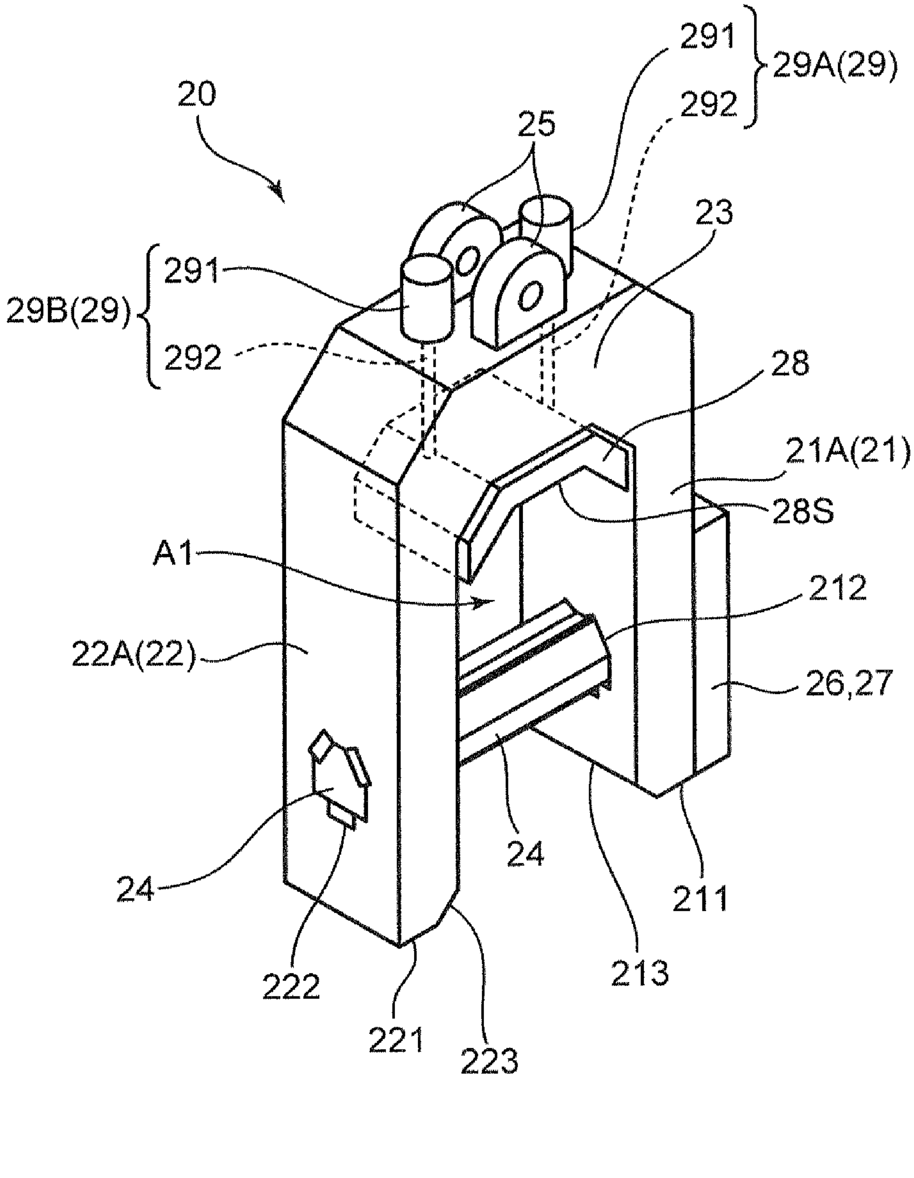
FIG. 18 is a perspective view showing a retention device of a suspension device according to a second modification of the first embodiment.
Figure 19:
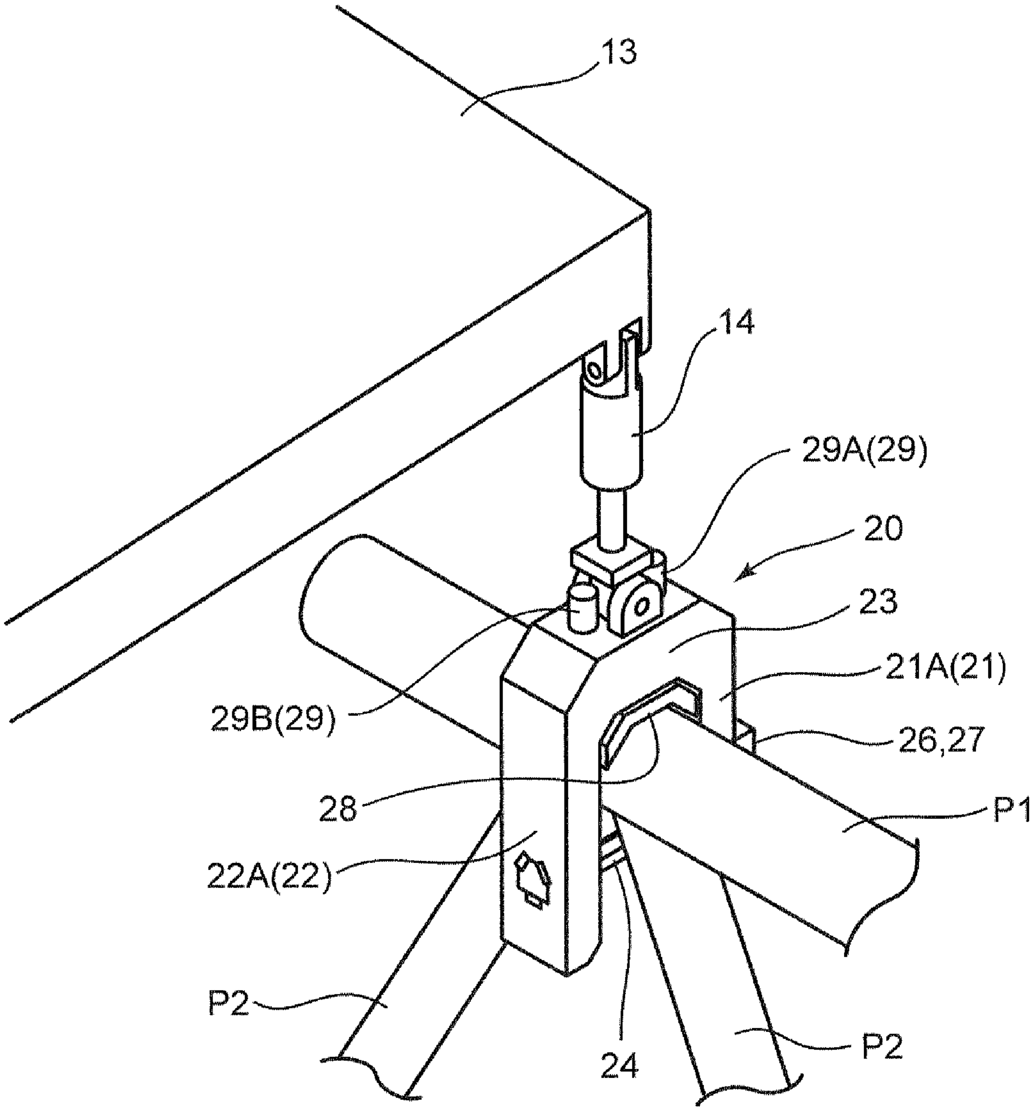
FIG. 19 is a perspective view showing a state in which the retention device of the suspension device according to the second modification is attached to a retained portion of the structure member.
Figure 20:
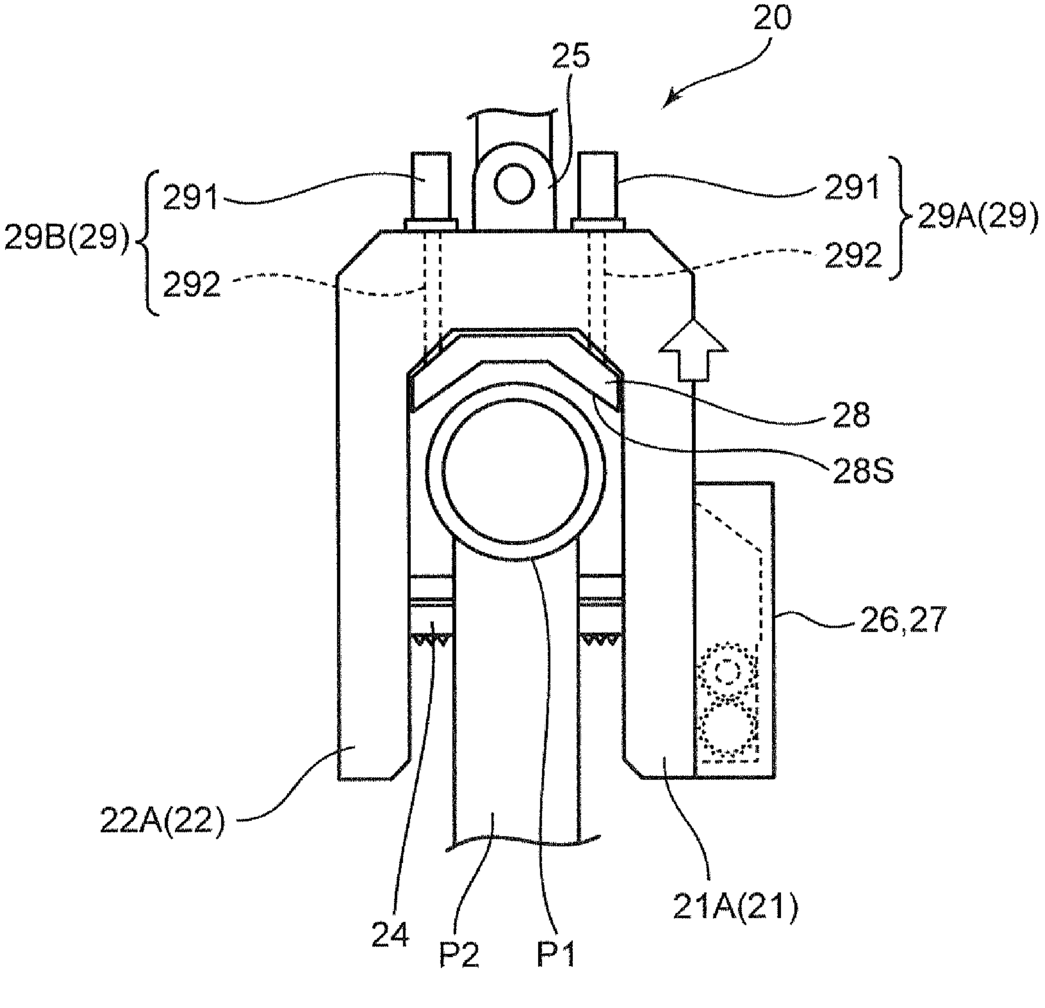
FIG. 20 is a front view of FIG. 19, the view illustrating a state before moving a position of an upper pressing member of the retention device.
Figure 21:
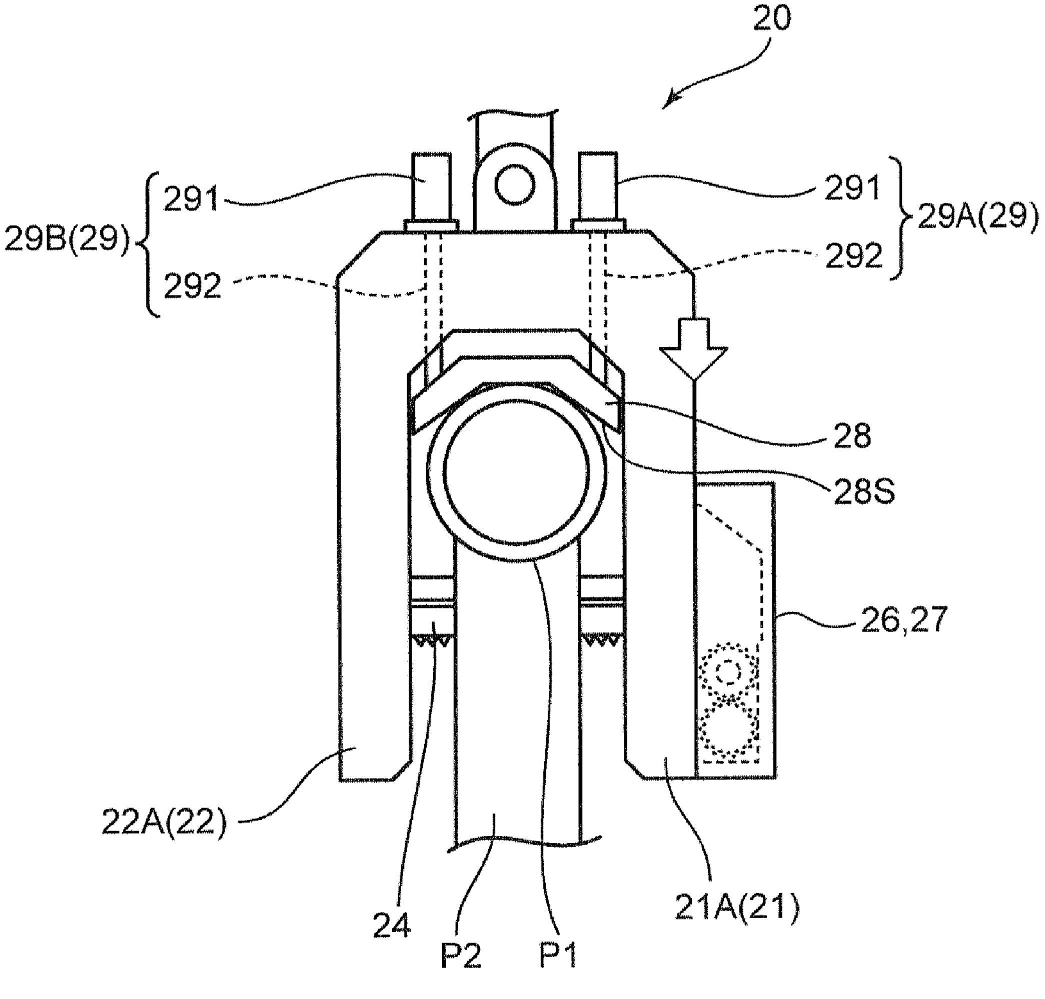
FIG. 21 is a front view of FIG. 19, the view illustrating a state after moving the position of the upper pressing member of the retention device.

FIG. 18 is a perspective view showing a retention device 20 of a suspension device 1 according to a second modification of the first embodiment. FIG. 19 is a perspective view showing a state in which the retention device 20 of the suspension device 1 according to the second modification is attached to a retained portion 10614 of the intermediate boom member 106. FIG. 20 is a front view of FIG. 19, the view illustrating a state before moving the position of the upper pressing member 28 of the retention device 20. FIG. 21 is a front view of FIG. 19, the view illustrating a state after moving the position of the upper pressing member 28 of the retention device 20.

As shown in FIG. 18, in this second modification, the shape of the opposing surface 28S (lower surface) of the upper pressing member 28 is different from that of the first modification. Further, in this second modification, the restricting portion is omitted.

In the second modification, the opposing surface 28S of the upper pressing member 28 has a shape corresponding to a shape of the upper portion of the retained portion 106H.

Specifically, the opposing surface 28S has a shape along a curved shape (arc shape) of an upper surface of the main pipe P1 in the retained portion 106H. The upper pressing member 28 having such opposing surface 28S can further suppress occurrence of rattling of the retained portion 106H that is retained on the support member 24 in the lifting work. Although in the specific example shown in FIG. 18, the opposing surface 28S is configured with a horizontal plane at the center and a pair of inclined planes located on both sides of the horizontal plane, the opposing surface is not limited to such a configuration. For example, the opposing surface 28S may have a curved shape along the curved shape (arc shape) of the upper surface of the main pipe P1.

As shown in FIG. 19, the retention device 20 is attached to the intermediate boom member 106 so that the support member 24 is located between the upper end portions of the two inclined pipes P2, P2, and the main pipe P1 is located between the upper pressing member 28 and the support member 24.

As shown in FIG. 20 and FIG. 21, a relative position in the up-down direction of the upper pressing member 28 with respect to the proximal end portion 23 can be changed by the upper pressing member moving mechanism 29 according to the dimension in the up-down direction of the retained portion 106H. As a result, even in a case where the dimension in the up-down direction of the retained portion 106H differs for each lifting work, the relative position of the upper pressing member 28 can be adjusted to a position suitable for the dimension in the up-down direction of the retained portion 106H, thereby enabling rattling of the retained portion 106H to be suppressed in the housing portion A1.

Figure 22:
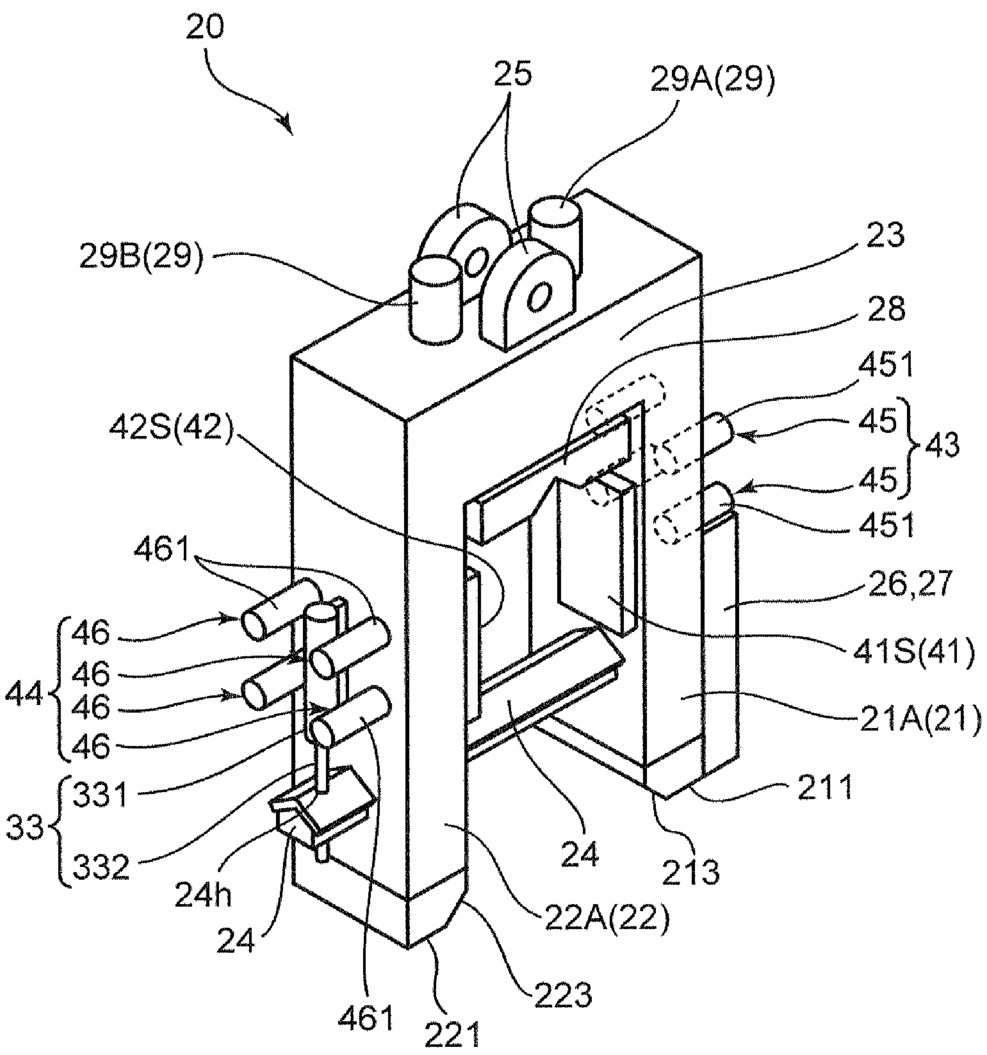
FIG. 22 is a perspective view showing a retention device of a suspension device according to a third modification of the first embodiment, the view illustrating a state before moving a position of a side pressing member of the retention device.
Figure 23:
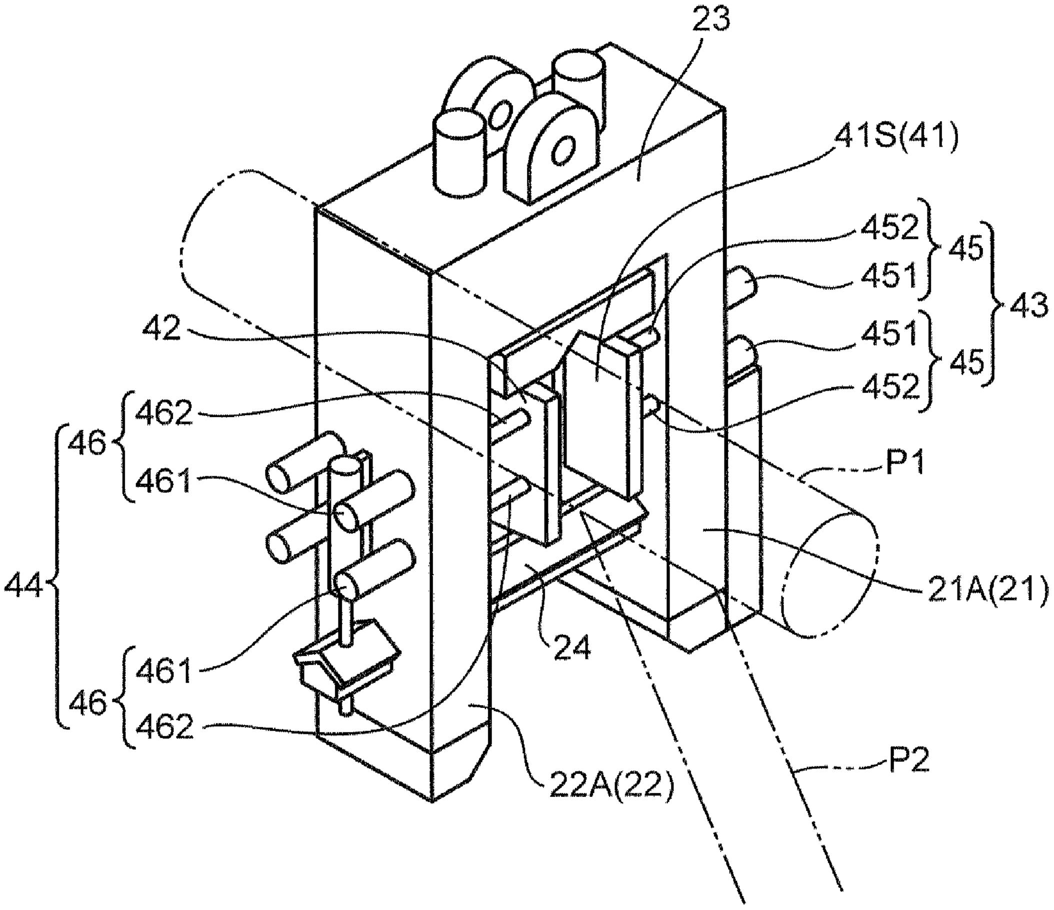
FIG. 23 is a perspective view showing the retention device of the suspension device according to the third modification, the view showing a state after moving the position of the side pressing member of the retention device.

FIG. 22 is a perspective view showing a retention device 20 of a suspension device 1 according to a third modification of the first embodiment, the view illustrating a state before moving positions of a first side pressing member 41 and a second side pressing member 42 of the retention device 20. FIG. 23 is a perspective view showing the retention device 20 of the suspension device 1 according to the third modification, the view illustrating a state after moving the positions of the first side pressing member 41 and the second side pressing member 42 of the retention device 20.

As shown in FIG. 22 and FIG. 23, the suspension device 1 according to the third modification differs from the above-described embodiment and modifications in that each of the plurality of retention devices 20 further includes the first side pressing member 41, the second side pressing member 42, a first side pressing member moving mechanism 43, and a second side pressing member moving mechanism 44. The same reference numerals are given to the same configurations as those of the embodiment and the modifications, and description thereof will be omitted.

The first side pressing member 41 is interposed between the first leg portion main body 21A and the second leg portion main body 22A. The first side pressing member 41 is supported by the first leg portion main body 21A via the first side pressing member moving mechanism 43. The first side pressing member 41 has a first opposing surface 41S opposed to a first side portion of the retained portion 106H that is retained on the support member 24.

The second side pressing member 42 is interposed between the first leg portion main body 21A and the second leg portion main body 22A. The second side pressing member 42 is supported by the second leg portion main body 22A via the second side pressing member moving mechanism 44. The second side pressing member 42 has a second opposing surface 42S opposed to a second side portion of the retained portion 106H that is retained on the support member 24.

The first side pressing member moving mechanism 43 operates so as to move the first side pressing member 41 relative to the first leg portion main body 21A, and the second side pressing member moving mechanism 44 operates so as to move the second side pressing member 42 relative to the second leg portion main body 22A. As a result, a horizontal distance between the first opposing surface 41S and the second opposing surface 42S changes.

The first side pressing member moving mechanism 43 is configured with a plurality of first cylinders 45 (four cylinders in the drawing). Each of the plurality of first cylinders 45 has a cylinder main body 451 and a cylinder rod 452. The cylinder main body 451 is fixed to the corresponding first leg portion main body 21A. The cylinder rod 452 is configured to be relatively movable laterally (for example, in the horizontal direction) with respect to the cylinder main body 451. The cylinder rod 452 is inserted into a through hole that horizontally penetrates the first leg portion main body 21A, and a distal end portion of the cylinder rod 452 is fixed to the first side pressing member 41.

The second side pressing member moving mechanism 44 is configured with a plurality of second cylinders 46 (four cylinders in the drawing). Each of the plurality of second cylinders 46 has a cylinder main body 461 and a cylinder rod 462. The cylinder main body 461 is fixed to the corresponding second leg portion main body 22A. The cylinder rod 462 is configured to be relatively movable laterally (for example, in the horizontal direction) with respect to the cylinder main body 461. The cylinder rod 462 is inserted into a through hole that horizontally penetrates the second leg portion main body 22A, and a distal end portion of the cylinder rod 462 is fixed to the second side pressing member 42.

Each of the plurality of first cylinders 45 and the plurality of second cylinders 46 is operated by, for example, hydraulic oil supplied from the drive source 1B shown in FIG. 2 via an oil passage (not shown). A switching valve (not shown) is disposed in the oil passage. When the switching valve is set at a neutral position, the hydraulic oil from the drive source 1B is not supplied to the cylinders 45 and 46. When the switching valve is switched from the neutral position to a first position and the hydraulic oil is supplied to a head side chamber of each of the cylinders 45 and 46, dimensions of the cylinder rods 452 and 462 protruding laterally from the cylinder main bodies 451 and 461 become large. As a result, the first side pressing member 41 and the second side pressing member 42 move in a direction to near to each other.

By contrast, when the switching valve is switched from the neutral position to a second position and the hydraulic oil is supplied to a rod side chamber of each of the cylinders 45 and 46, the dimensions of the cylinder rods 452 and 462 protruding from the cylinder main bodies 451 and 461 become small. As a result, the first side pressing member 41 and the second side pressing member 42 move in a direction to go away from each other. The cylinders 45 and 46 may be electric cylinders, and in this case, the drive source 1B is configured with a power source. Further, each of the first side pressing member moving mechanism 43 and the second side pressing member moving mechanism 44 is not limited to a configuration including the four cylinders, but may be configured with a single cylinder, or with a plurality of cylinders other than four.

In this third modification, even in a case where a relatively large gap is formed between the leg portion main bodies 21A, 22A and the retained portion 106H due to a relatively large difference between a horizontal distance between the first leg portion main body 21A and the second leg portion main body 22A and a horizontal dimension of the retained portion 106H, the gap is reduced by the first and second side pressing members 41 and 42 interposed between the first leg portion main body 21A and the second leg portion main body 22A. This enables rattling of the retained portion 106H that is retained on the support member 24 to be suppressed.

Figure 24:
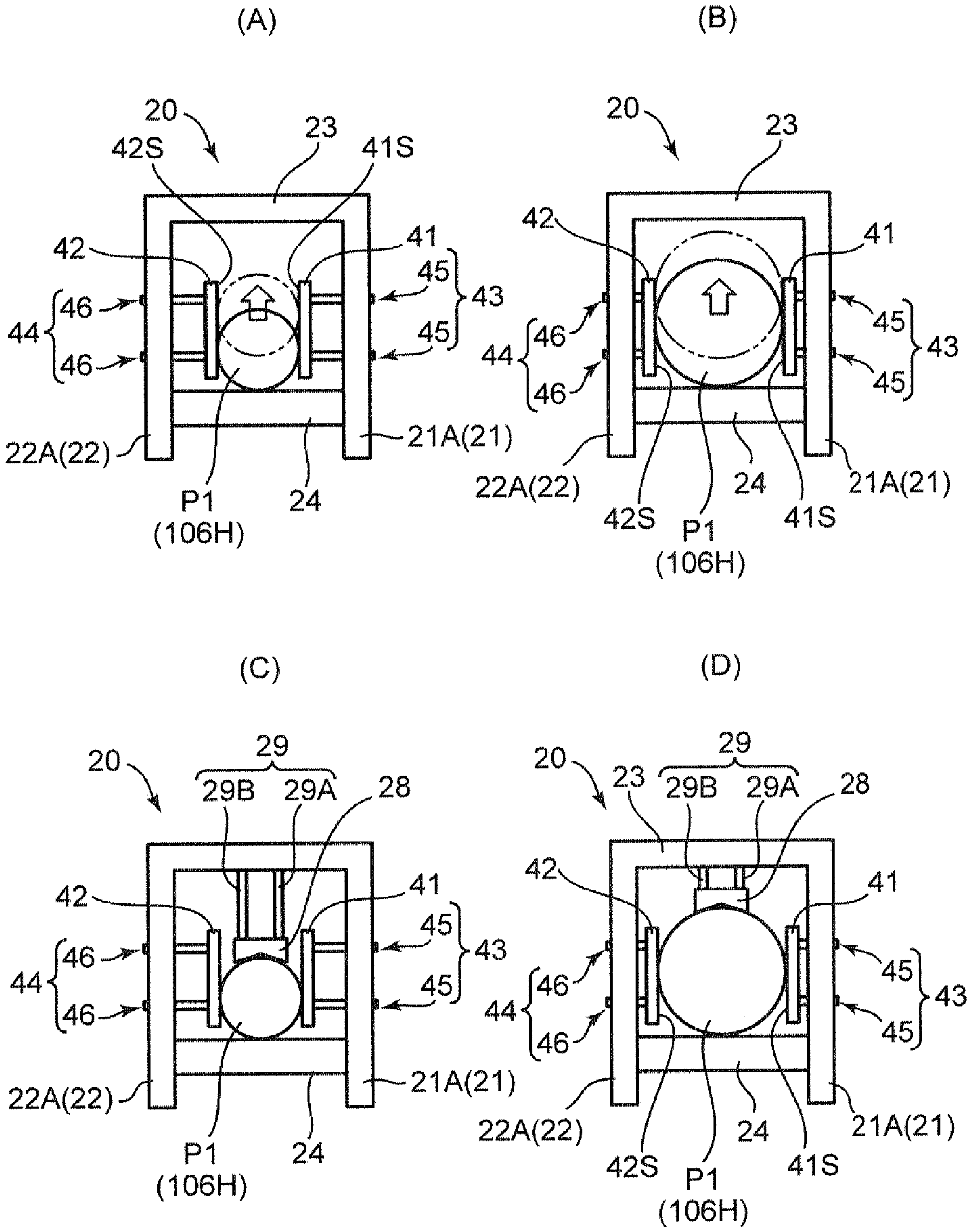
FIG. 24 illustrates conceptual views each showing a state in which a retained portion is retained by the retention device of the suspension device according to the third modification.

FIG. 24 illustrates conceptual views each showing a state in which the retained portion is retained by the retention device of the suspension device according to the third modification. As shown in FIG. 24(A) and FIG. 24(B), in the third modification, the horizontal distance between the first opposing surface 41S and the second opposing surface 42S can be changed according to the horizontal dimension of the retained portion 106H. As a result, even in a case where the horizontal dimension of the retained portion 106H differs for each lifting work, it is possible to adjust the horizontal distance between the first opposing surface 41S and the second opposing surface 42S so as to be suitable for the horizontal dimension of the retained portion 106H, thereby suppressing occurrence of rattling of the retained portion 106H that is retained on the support member 24.

Further, in the third modification, as shown in FIG. 24(C) and FIG. 24(D), the retention device 20 preferably further includes the upper pressing member 28 and the upper pressing member moving mechanism 29 similarly to the second modification. In this mode, a relative position of the upper pressing member 28 with respect to the proximal end portion 23 can be changed according to the dimension in the up-down direction of the retained portion 106H. As a result, even in a case where the dimension in the up-down direction of the retained portion 106H differs for each lifting work, the relative position of the upper pressing member 28 can be adjusted to a position suitable for the dimension in the up-down direction of the retained portion 106H to suppress occurrence of rattling of the retained portion 106H that is retained on the support member 24.

Although in FIG. 22 and FIG. 23 showing the specific example of the third modification, each of the first opposing surface 41S and the second opposing surface 42S is formed of a flat surface, it may be configured with a following surface. Specifically, it is preferable that the first opposing surface 41S has a shape corresponding to a shape of the first side portion (side portion opposed to the first opposing surface 41S) of the retained portion 106H that is retained on the support member 24, and that the second opposing surface 42S has a shape corresponding to a shape of the second side portion (side portion opposed to the second opposing surface 42S) of the retained portion 106H that is retained on the support member 24. Specifically, it is preferable that the first opposing surface 41S has a shape along a curved shape (arc shape) of a side surface (surface on the first side portion) of the main pipe P1 in the retained portion 106H, and that the second opposing surface 42S has a shape along a curved shape (arc shape) of a side surface (surface on the second side portion) of the main pipe P1 in the retained portion 106H. In this mode, the first side pressing member 41 having such first opposing surface 41S as described above and the second side pressing member 42 having such second opposing surface 42S as described above can further suppress occurrence of rattling of the retained portion 106H that is retained on the support member 24 during the lifting work.

Second Embodiment

Figure 25:
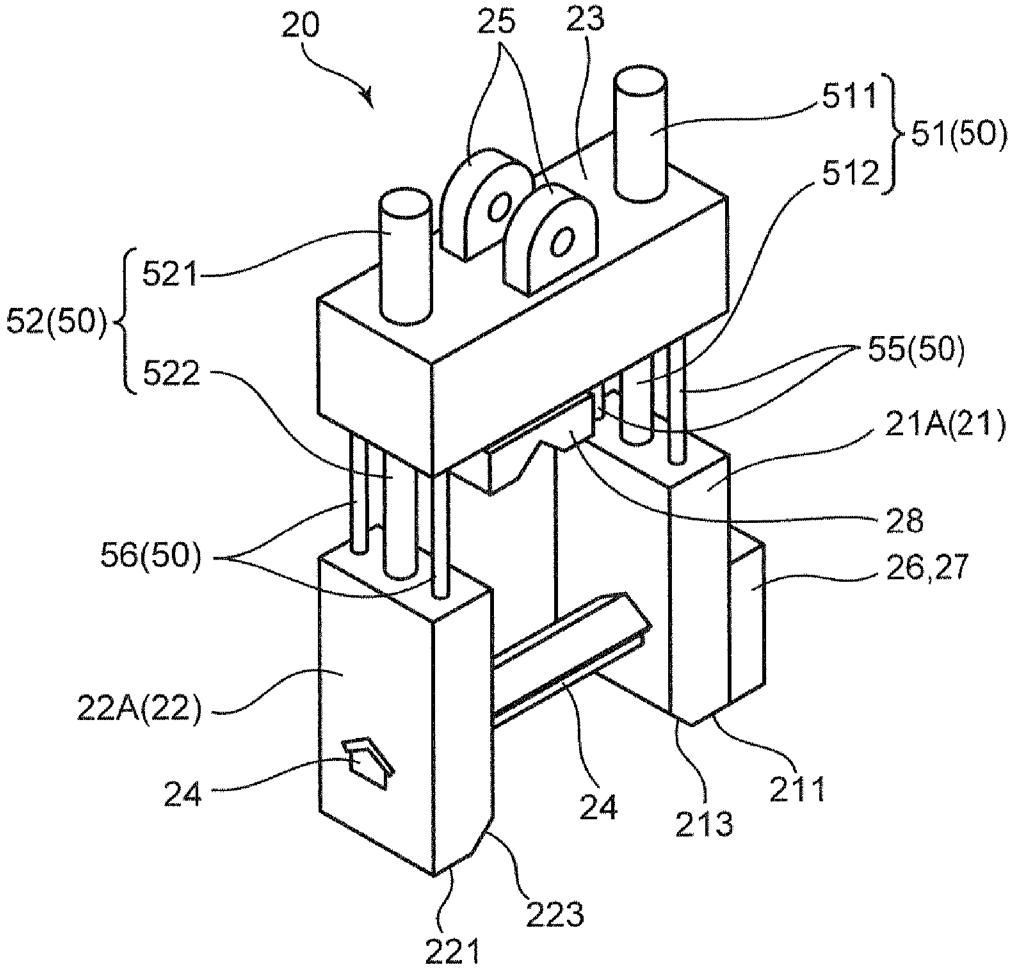
FIG. 25 is a perspective view showing a retention device of a work machine suspension device according to a second embodiment.
Figure 26:
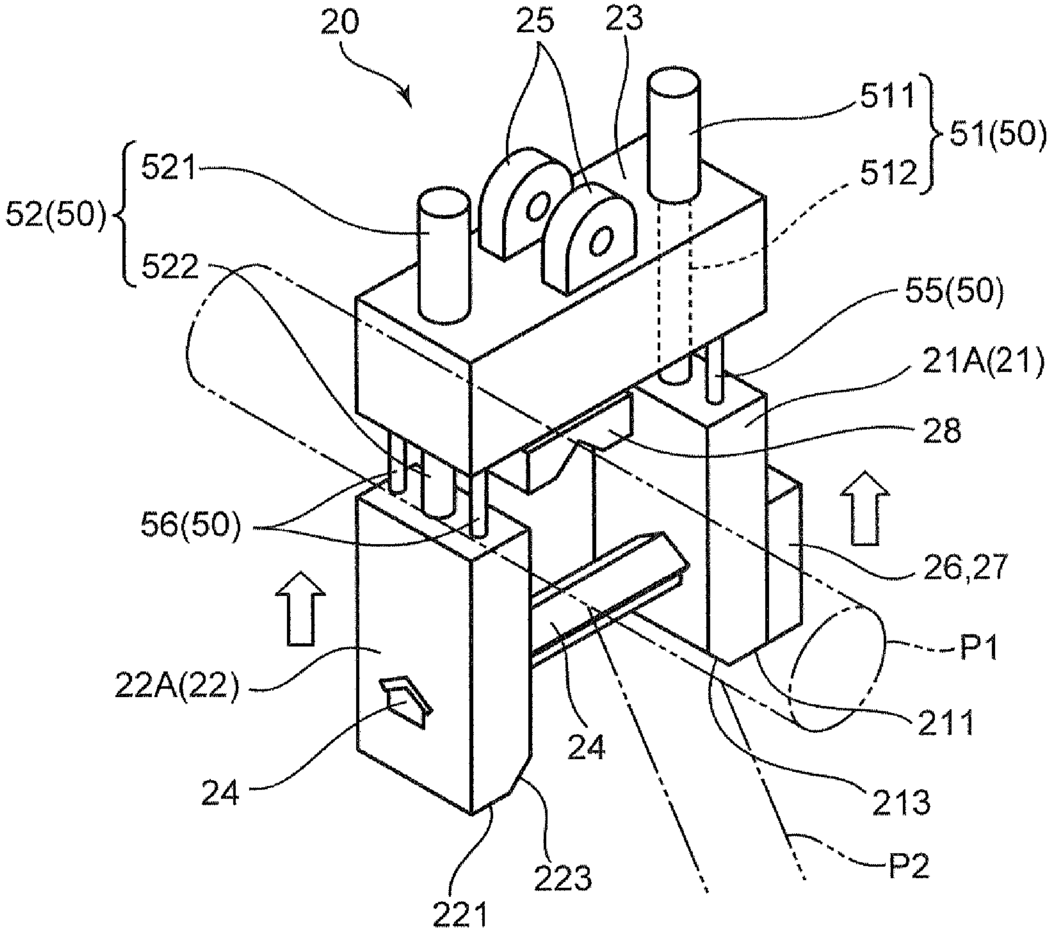
FIG. 26 is a perspective view showing the retention device of the work machine suspension device according to the second embodiment.

FIG. 25 and FIG. 26 are perspective views showing a retention device 20 of a suspension device 1 according to a second embodiment. The suspension device 1 according to the second embodiment is different from the first embodiment in that the first leg portion main body 21A and the second leg portion main body 22A are movable in the up-down direction with respect to the proximal end portion 23. In the following, description will be made of the difference, and description of the other configurations will be omitted.

In the second embodiment, the distance between the proximal end portion 23 and the support member 24 in the up-down direction can be changed by changing the relative positions in the up-down direction of the first leg portion main body 21A and the second leg portion main body 22A with respect to the proximal end portion 23 according to the dimension in the up-down direction of the retained portion 106H. As a result, even in a case where the dimension in the up-down direction of the retained portion 106H differs for each lifting work, the relative positions of the first leg portion main body 21A and the second leg portion main body 22A with respect to the proximal end portion 23 can be adjusted to positions suitable for the dimension in the up-down direction of the retained portion 106H, thereby suppressing occurrence of rattling of the retained portion 106H retained on the support member 24.

In the following, the second embodiment will be specifically described.

As shown in FIG. 25, each of the plurality of retention devices 20 includes an up-down moving mechanism 50 that operates to cause the first leg portion main body 21A and the second leg portion main body 22A to move in the up-down direction relative to the proximal end portion 23. The up-down moving mechanism 50 includes a first cylinder 51, a second cylinder 52, a plurality of first guide members 55, and a plurality of second guide members 56.

The first cylinder 51 has a cylinder main body 511 and a cylinder rod 512. The cylinder main body 511 is fixed to the proximal end portion 23. The cylinder rod 512 is configured to be movable in the up-down direction relative to the cylinder main body 511. The cylinder rod 512 is inserted into a through hole that penetrates the proximal end portion 23 in the up-down direction, and a lower end portion of the cylinder rod 512 is located below the proximal end portion 23 and is fixed to an upper portion of the first leg portion main body 21A.

Similarly, the second cylinder 52 has a cylinder main body 521 and a cylinder rod 522. The cylinder main body 521 is fixed to the proximal end portion 23. The cylinder rod 522 is configured to be movable in the up-down direction relative to the cylinder main body 521. The cylinder rod 522 is inserted into a through hole that penetrates the proximal end portion 23 in the up-down direction, and a lower end portion of the cylinder rod 522 is located below the proximal end portion 23 and is fixed to an upper portion of the second leg portion main body 22A.

Each of the first and second cylinders 51 and 52 is operated by, for example, hydraulic oil supplied from the drive source 1B shown in FIG. 2 via an oil passage (not shown). A switching valve (not shown) is disposed in the oil passage. When the switching valve is set at a neutral position, the hydraulic oil from the drive source 1B is not supplied to the first and second cylinders 51 and 52. When the switching valve is switched from the neutral position to a first position and the hydraulic oil is supplied to head side chambers of the first and second cylinders 51 and 52, dimensions of the cylinder rods 512 and 522 protruding downward from the cylinder main bodies 511 and 521 become large. As a result, the first leg portion main body 21A and the second leg portion main body 22A are lowered. By contrast, when the switching valve is switched from the neutral position to a second position and the hydraulic oil is supplied to a rod side chamber of each of the first and second cylinders 51 and 52, the dimensions of the cylinder rods 512 and 522 protruding downward from the cylinder main bodies 511 and 521 become small. As a result, the first leg portion main body 21A and the second leg portion main body 22A rise. The first and second cylinders 51 and 52 may be electric cylinders, and in this case, the drive source 1B is configured with a power source.

Each of the plurality of first guide members 55 has a rod shape. An upper end portion of each of the plurality of first guide members 55 is fixed to the proximal end portion 23. Each of the plurality of first guide members 55 extends downward from the proximal end portion 23 and is inserted into a hole portion formed in the up-down direction in the first leg portion main body 21A. The plurality of first guide members 55 move in the up-down direction relative to the first leg portion main body 21A as the first leg portion main body 21A moves in the up-down direction, thereby stabilizing the movement of the first leg portion main body 21A in the up-down direction. Similarly, the plurality of second guide members 56 have the same configuration as the plurality of first guide members 55, and stabilize movement of the second leg portion main body 22A in the up-down direction.

Third Embodiment

FIG. 27 is a perspective view showing a retention device 20 of a suspension device 1 according to a third embodiment. The suspension device 1 according to the third embodiment differs from the second embodiment in further including a configuration in which the first leg portion main body 21A and the second leg portion main body 22A are movable relative to the proximal end portion 23 in the horizontal direction. In the following, description will be made of the difference, and description of the other configurations will be omitted.

In this third embodiment, a horizontal distance between the first leg portion main body 21A and the second leg portion main body 22A can be changed according to a horizontal dimension of the retained portion 106H. As a result, even in a case where the horizontal dimension of the retained portion 106H differs for each lifting work, the horizontal distance between the first leg portion main body 21A and the second leg portion main body 22A can be adjusted to be suitable for the horizontal dimension of the retained portion 106H, thereby suppressing occurrence of rattling of the retained portion 106H that is retained on the support member 24.

In the following, the third embodiment will be specifically described.

As shown in FIG. 27, the first leg portion 21 includes not only the first leg portion main body 21A but also a first upper member 21B disposed above the first leg portion main body 21A. The second leg portion 22 includes not only the second leg portion main body 22A but also a second upper member 22B disposed above the second leg portion main body 22A. The first upper member 21B and the second upper member 22B are disposed on both sides of the proximal end portion 23. In other words, the first upper member 21B, the proximal end portion 23, and the second upper member 22B are disposed in this order in the horizontal direction.

The first leg portion main body 21A is supported by the first upper member 21B by means of a first cylinder 51 of an up-down moving mechanism 50 having the same structure as that of the up-down moving mechanism 50 in the second embodiment, and is configured to be movable in the up-down direction relative to the first upper member 21B. The second leg portion main body 22A is supported by the second upper member 22B by means of a second cylinder 52 of an up-down moving mechanism 50 having the same structure as that of the up-down moving mechanism 50 in the second embodiment, and is configured to be movable in the up-down direction relative to the second upper member 22B. Since the configurations of the first and second cylinders 52 are the same as those of the second embodiment, the same reference numerals as those of the second embodiment are given thereto to omit detailed description thereof.

In the third embodiment shown in FIG. 27, each of the plurality of retention devices 20 further includes a side moving mechanism 60. The side moving mechanism 60 operates so as to change the horizontal distance between the first leg portion main body 21A and the second leg portion main body 22A by moving the first leg portion main body 21A and the second leg portion main body 22A relative to the proximal end portion 23. The side moving mechanism 60 includes a plurality of first cylinders 61 (a pair of cylinders in the illustrated example), a plurality of second cylinders 62 (a pair of cylinders in the illustrated example), a plurality of first guide members 65, and a plurality of second guide members 66.

Each of the plurality of first cylinders 61 has a cylinder main body 611 and a cylinder rod 612. The cylinder main body 611 is fixed to the first upper member 21B. The cylinder rod 612 is configured to be movable relative to the cylinder main body 511 in the horizontal direction. The cylinder rod 612 is inserted into a through hole that horizontally penetrates the first upper member 21B, and a distal end portion of the cylinder rod 612 is fixed to a side portion of the proximal end portion 23.

Similarly, each of the plurality of second cylinders 62 has a cylinder main body 621 and a cylinder rod 622. The cylinder main body 621 is fixed to the second upper member 22B. The cylinder rod 622 is configured to be movable relative to the cylinder main body 621 in the horizontal direction. The cylinder rod 622 is inserted into a through hole that horizontally penetrates the second upper member 22B, and a distal end portion of the cylinder rod 622 is fixed to the side portion of the proximal end portion 23.

Each of the first and second cylinders 61 and 62 is operated by, for example, hydraulic oil supplied from the drive source 1B shown in FIG. 2 via an oil passage (not shown). A switching valve (not shown) is disposed in the oil passage. When the switching valve is set at a neutral position, the hydraulic oil from the drive source 1B is not supplied to the first and second cylinders 61 and 62.

When the switching valve is switched from the neutral position to a first position, and the hydraulic oil is supplied to head side chambers of the first and second cylinders 61 and 62, dimensions of the cylinder rods 612 and 622 protruding laterally from the cylinder main bodies 611 and 621 become large. This causes the first upper member 21B to move in a direction to go away from the proximal end portion 23 (horizontal direction), and the second upper member 22B to move in a direction to go away from the proximal end portion 23 (horizontal direction). As a result, the first leg portion 21 including the first leg portion main body 21A and the first upper member 21B moves in a direction (horizontal direction) to go away from the proximal end portion 23, and the second leg portion 22 including the second leg portion main body 22A and the second upper member 22B moves in a direction (horizontal direction) to go away from the proximal end portion 23.

On the other hand, when the switching valve is switched from the neutral position to a second position and the hydraulic oil is supplied to rod side chambers of the first and second cylinders 61 and 62, the dimensions of the cylinder rods 612 and 622 protruding from the cylinder main bodies 611 and 621 become small. This causes the upper member 21B to move in a direction (horizontal direction) to near the proximal end portion 23, and the second upper member 22B to move in a direction (horizontal direction) to near the proximal end portion 23. As a result, the first leg portion 21 including the first leg portion main body 21A and the first upper member 21B moves in a direction (horizontal direction) to near the proximal end portion 23, and the second leg portion 22 including the second leg portion main body 22A and the second upper member 22B moves in a direction (horizontal direction) to near the proximal end portion 23. The first and second cylinders 61 and 62 may be electric cylinders, and in this case, the drive source 1B is configured with a power source.

Each of the plurality of first guide members 65 has a rod shape. Each proximal end portion of the plurality of first guide members 65 is fixed to the first upper member 21B. Each of the plurality of first guide members 65 extends horizontally from the first upper member 21B and is inserted into a horizontal hole formed in the proximal end portion 23. The plurality of first guide members 65 move in the horizontal direction as the first upper member 21B moves in the horizontal direction, thereby stabilizing horizontal movement of the first upper member 21B. Similarly, the plurality of second guide members 66 have the same configuration as the plurality of first guide members 65, and stabilize horizontal movement of the second upper member 22B.

[Other Modifications]

In the embodiments, the inclined surfaces 213 and 223 of the first leg portion main body 21A and the second leg portion main body 22A can be omitted. Further, in the embodiments, the base member 13 can be omitted. In the embodiments, the support member moving mechanism 26 and the drive part 27 can be omitted.

Although in the embodiments, the suspension device 1 includes four retention devices 20, it may include a plurality of retention devices 20 other than four.

Although in the embodiments, as shown in FIG. 1 and FIG. 5, the retained portion 106H of the intermediate boom member 106 to which the retention device 20 is attached is a connection part at which the pair of inclined pipes P2, P2 are connected to the main pipe P1 in the intermediate boom member 106, and the support member 24 of the retention device 20 is disposed between the pair of inclined pipes P2, P2, the retained portion 106H is not limited to the part shown in FIG. 1 and FIG. 5, and a part where the support member 24 is disposed is not limited to the part shown in FIG. 1 and FIG. 5. The following mode is among modifications of these parts.

Figure 28:
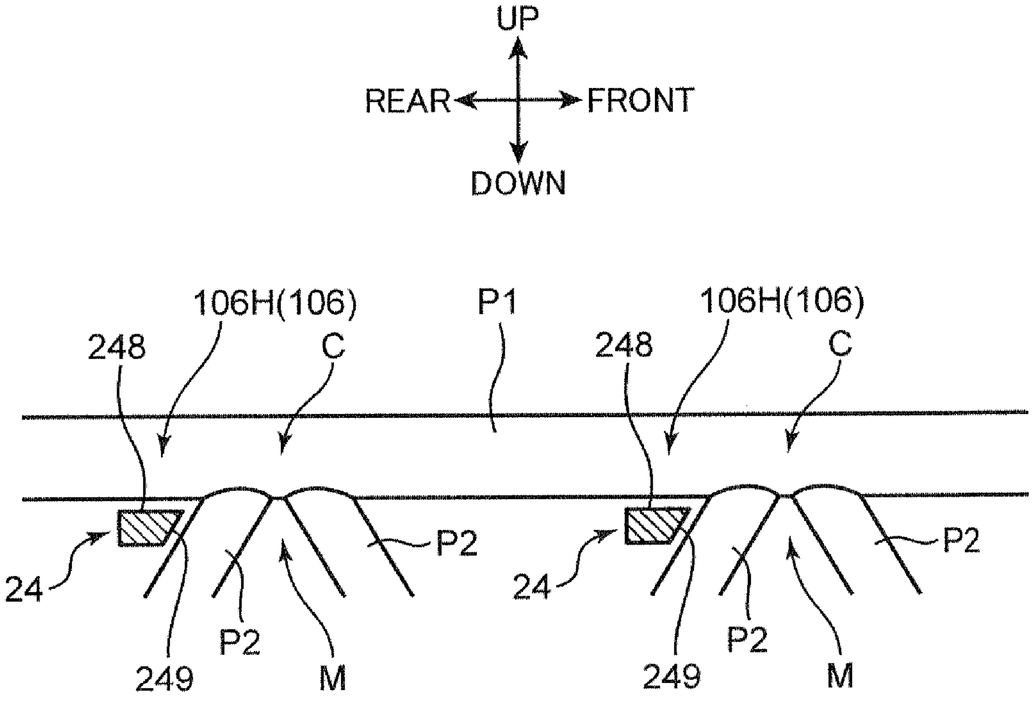
FIG. 28 is a view showing a positional relationship between a support member and a retained portion according to a modification.
Figure 29:
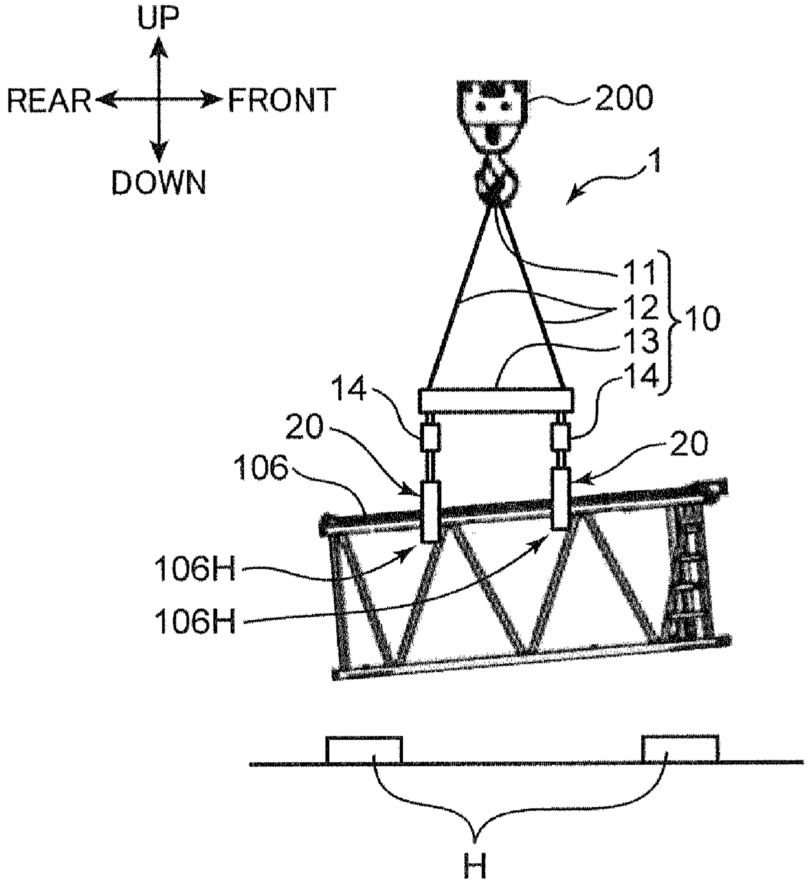
FIG. 29 is a view showing lifting work for lifting up a structure member by using the work machine suspension device provided with the support member according to the modification of FIG. 28.

FIG. 28 is a view showing a positional relationship between a support member 24 of the retention device 20 according to a modification and a retained portion 106H of the intermediate boom member 106, and FIG. 29 is a view showing lifting work of lifting up the intermediate boom member 106 by using the suspension device 1 provided with the support member 24 according to the modification of FIG. 28. Although the suspension device 1 according to the modification includes, for example, four retention devices 20 disposed in a manner as shown in FIG. 2, in the side views of FIG. 28 and FIG. 29, only the two retention devices 20 of the four retention devices 20 are illustrated. Further, in FIG. 28, in order to describe a positional relationship between the support member 24 and a main pipe P1 and a pair of inclined pipes P2, P2 of the intermediate boom member 106, only a cross section of the support member 24 is illustrated among the members constituting each retention device 20.

In this modification, as shown in FIG. 28 and FIG. 29, the retained portion 106H of the intermediate boom member 106 to which the retention device 20 is attached is located at a position deviated to one side in a longitudinal direction of the main pipe P1 with respect to a connection part C at which the pair of inclined pipes P2, P2 are connected to the main pipe P1 in the intermediate boom member 106. Further, as shown in FIG. 28, the support member 24 of each retention device 20 is not disposed in a region M between the pair of inclined pipes P2, P2, but is disposed at a position deviated to one side in the longitudinal direction with respect to the region M.

Each support member 24 has a shape corresponding to a shape of a lower portion of the retained portion 106H retained on the support member 24. Specifically, each support member 24 has an upper surface 248 (an example of a contact surface) along a lower surface of the main pipe P1 in the retained portion 106H and an inclined surface 249 (an example of a contact surface) inclined along a side surface of one inclined pipe P2 (a side surface of the left inclined pipe P2 in FIG. 28). The upper surface 248 is formed of a flat surface or a curved surface along the lower surface of the main pipe P1. Further, as shown in FIG. 28, when the support member 24 is viewed in the longitudinal direction thereof, the inclined surface 249 is inclined in the same direction as the one inclined pipe P2 with respect to the vertical direction.

Figure 30:
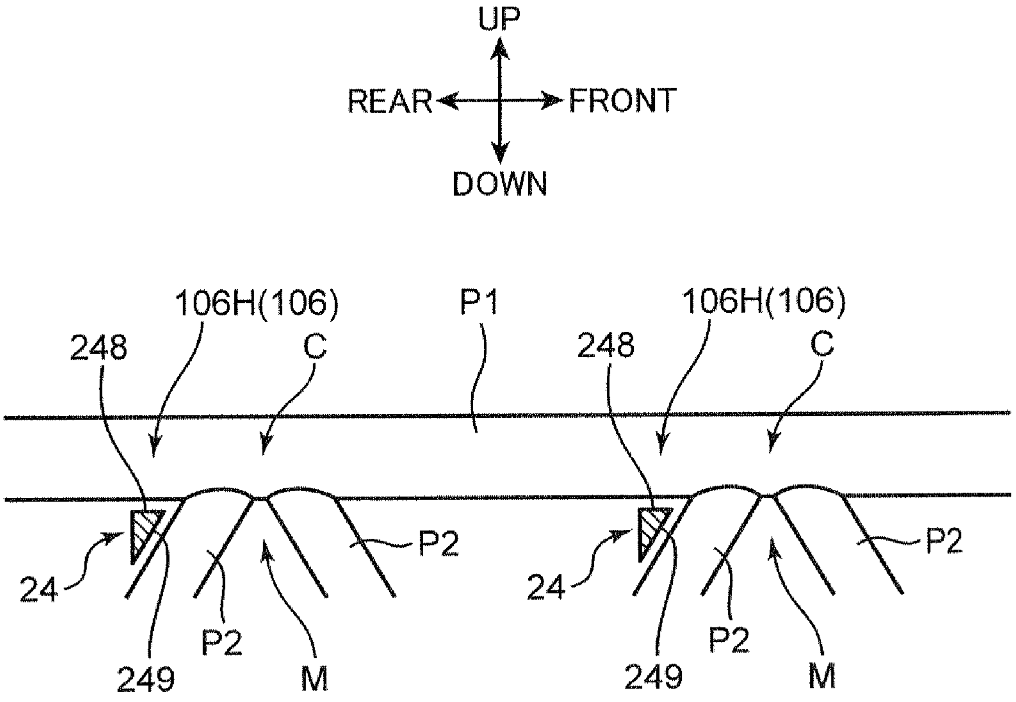
FIG. 30 is a view showing a positional relationship between a support member and a retained portion according to another modification.

Although a cross-sectional shape of the support member 24 according to the modification shown in FIG. 28 is trapezoidal, the cross-sectional shape of the support member 24 is not limited thereto, and may be another shape such as a triangular shape as shown in FIG. 30. The support member 24 having a triangular shape shown in FIG. 30 has the upper surface 248 and the inclined surface 249 similarly to the support member 24 shown in FIG. 28.

When coupling the intermediate boom member 106 (the second intermediate boom member 106) to the first intermediate boom member 105 shown in FIG. 1, for example, as shown in FIG. 29, the intermediate boom member 106 may be disposed to have an inclined attitude with respect to the ground. For disposing the intermediate boom member 106 so as to have such an inclined attitude, it is only necessary to adjust lengths of the four cylinders 14 such that lengths of two rear cylinders 14 shown in FIG. 29 out of the four cylinders 14 of the attachment part 10 are larger than lengths of two front cylinders 14. In such an inclined attitude, the upper surface 248 and the inclined surface 249 of the support member 24 are in contact with the lower surface of the main pipe P1 and the side surface of the one inclined pipe P2 in the retained portion 106H, respectively. This enables the intermediate boom member 106 to be stably retained in the inclined attitude by the four retention devices 20.

Figure 31:
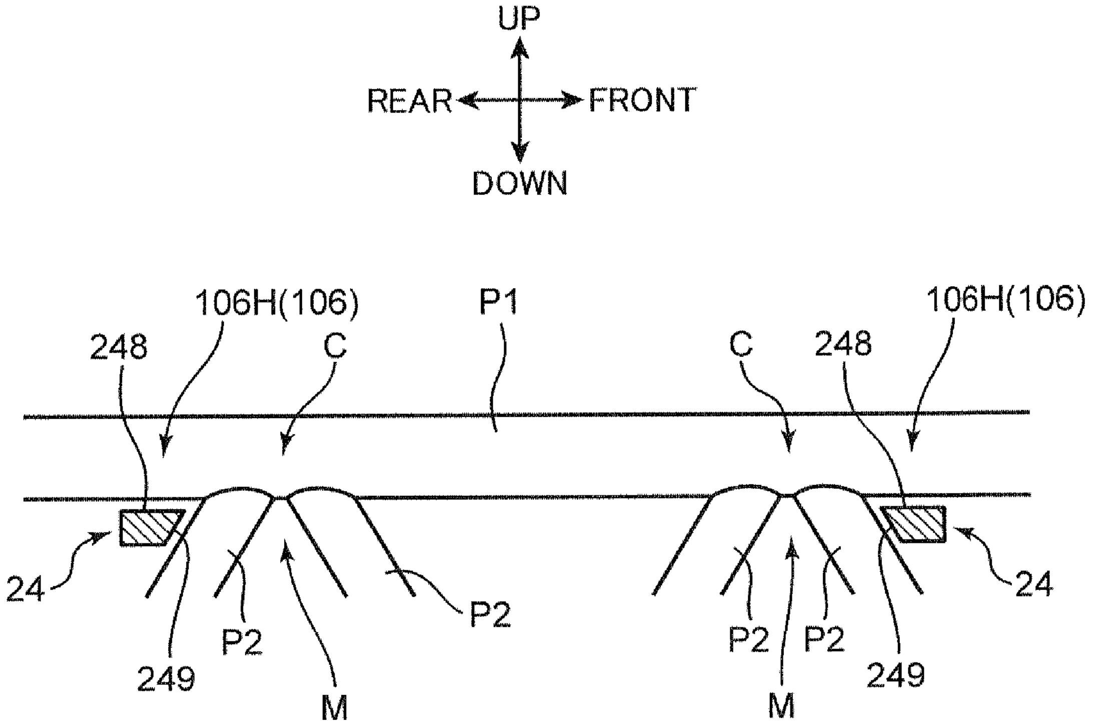
FIG. 31 is a view showing another example of the positional relationship between the support member and the retained portion according to the modification.

FIG. 31 is a view showing another example of a positional relationship between the support member 24 and the retained portion 106H according to the modification. In this modification, as shown in FIG. 31, of the four retained portions 106H of the intermediate boom member 106 to which the retention devices 20 are attached, the rear retained portion 106H is located at a position deviated to one side (rear side in FIG. 31) of the longitudinal direction of the main pipe P1 with respect to the connection part C at which the pair of inclined pipes P2, P2 are connected to the main pipe P1 in the intermediate boom member 106. Of the four retained portions 106H, the front retained portion 106H is located at a position deviated to the other side (front side in FIG. 31) in the longitudinal direction of the main pipe P1 with respect to the connection part C of the intermediate boom member 106.

Although not shown, in the modifications of FIG. 28 to FIG. 31, a part of the four retained portions 106H may be the connection part C at which the pair of inclined pipes P2, P2 are connected to the main pipe P1 in the intermediate boom member 106 (e.g., such a part as shown in FIG. 5), and the corresponding support member 24 may be disposed in the region M between the pair of inclined pipes P2, P2 (e.g., such arrangement as shown in FIG. 5).

As described in the foregoing, the present disclosure provides a work machine suspension device, a retention device, and a method for suspending a structure member which enable, in lifting work for lifting a structure member included in a work machine, the worker's labor to be reduced and time required for the lifting work to be shortened.

There is provided a work machine suspension device for conducting lifting work of lifting up a structure member included in a work machine by lifting equipment. The work machine suspension device includes: an attachment part to be attached to the lifting equipment in the lifting work; and a plurality of retention devices supported by the attachment part, in which each of the plurality of retention devices includes: a proximal end portion connected to the attachment part; a first leg portion that is supported by the proximal end portion and includes a first leg portion main body that is disposed below the proximal end portion; a second leg portion that is supported by the proximal end portion and includes a second leg portion main body disposed below the proximal end portion, the second leg portion main body being disposed at an interval in a horizontal direction from the first leg portion main body; and a support member supported by the first leg portion main body so as to be movable between an entry allowed position and a retention position. The entry allowed position is a position where the support member retracts from the second leg portion main body to allow a retained portion as a part of the structure member to enter between the first leg portion main body and the second leg portion main body, and the retention position is a position where the retained portion is retained on the support member while the support member is supported by the first leg portion main body and the second leg portion main body.

In this work machine suspension device, with the support member of each of the plurality of retention devices disposed at the entry allowed position, each of the plurality of retention devices is lowered relative to the corresponding retained portion, thereby causing the corresponding retained portion to enter between the first leg portion main body and the second leg portion main body. Next, the support member of each of the plurality of retention devices is moved from the entry allowed position to the retention position. As a result, while being supported by the first leg portion main body and the second leg portion main body, the support member can retain the retained portion on the support member, so that the structure member can be lifted up by lifting up the attachment part of the work machine suspension device by the lifting equipment. Accordingly, this work machine suspension device makes it possible to simplify or omit the assisting work by the worker in the raising process of the hook by the hook raising operation, and enables the operator to quickly conduct the hook raising operation. Therefore, this work machine suspension device enables worker's labor to be reduced in the lifting work and time required for the lifting work to be shortened.

Here, the attachment part may have a simple mode, for example, may be configured with only a plurality of wire ropes that support the plurality of retention devices. In this case, an upper end portion of each of the plurality of wire ropes is attached to the hook of the lifting equipment, and a lower end portion of each of the plurality of wire ropes is attached to the corresponding retention device among the plurality of retention devices. It is noted that in a case where the attachment part includes the following base member, stability when the structure member is lifted up in the lifting work is improved as compared with the case where the attachment part is configured with only the plurality of wire ropes.

In other words, it is preferable that in the work machine suspension device, the attachment part includes a base member that supports the plurality of retention devices, and that the plurality of retention devices are fixed to the base member so as to be capable of hanging from the base member at intervals from each other in a horizontal direction.

In this mode, since the plurality of retention devices fixed to the base member are hung from the base member at intervals from each other in the horizontal direction, the relative positions of the plurality of retention devices can be easily maintained, so that stability when the structure member is lifted up in the lifting work is improved.

Here, the operation of moving of the support member between the retention position and the entry allowed position may be manually conducted by a worker such as a slinging worker. It is noted that the following mode makes it possible to further reduce the labor of the worker.

In other words, in the work machine suspension device, each of the plurality of retention devices preferably further includes: a support member moving mechanism that operates so as to move the support member between the entry allowed position and the retention position; and a drive part that drives the support member moving mechanism.

In this mode, since the support member is moved between the retention position and the entry allowed position by the support member moving mechanism driven by the drive part, it is not necessary for the worker to manually move the support member, resulting in further reducing the labor of the worker.

It is preferable that in the work machine suspension device, the support member has a contact surface in contact with the retained portion that is retained on the support member, the contact surface having a shape corresponding to a shape of the retained portion.

In this mode, the support member having the contact surface as described above can retain the retained portion more stably in the lifting work.

It is preferable that in the work machine suspension device, each of the plurality of retention devices further includes a restricting portion configured to be switched between a restriction state of restricting movement of the support member from the retention position and an allowable state of allowing the support member to move from the retention position to the entry allowed position.

In this mode, when the structure member is lifted up in the lifting work, it is possible to reliably prevent the support member from moving from the retention position to the entry allowed position against an intention of work-related personnel such as the worker or the operator.

In the work machine suspension device, each of the plurality of retention devices may further include an upper pressing member that is interposed between the proximal end portion and the support member so as to be supported by at least one of the proximal end portion, the first leg portion, and the second leg portion, the upper pressing member having an opposing surface opposed to an upper portion of the retained portion that is retained on the support member.

In this mode, even in a case where a relatively large gap is formed between the retained portion and the proximal end portion due to a relatively large difference between a distance in an up-down direction between the proximal end portion and the support member and a dimension in the up-down direction of the retained portion, the gap is reduced by the upper pressing member interposed between the proximal end portion and the support member. As a result, it is possible to suppress occurrence of rattling of the retained portion that is retained on the support member.

In the work machine suspension device, each of the plurality of retention devices preferably further includes an upper pressing member moving mechanism that operates so as to move the upper pressing member in an up-down direction relative to the proximal end portion.

In this mode, a relative position of the upper pressing member with respect to the proximal end portion can be changed according to the dimension in the up-down direction of the retained portion. As a result, even in a case where the dimension in the up-down direction of the retained portion differs for each lifting work, the relative position of the upper pressing member can be adjusted to a position suitable for the dimension in the up-down direction of the retained portion, thereby enabling occurrence of rattling of the retained portion that is retained on the support member to be suppressed.

In the work machine suspension device, the opposing surface of the upper pressing member preferably has a shape corresponding to a shape of the upper portion of the retained portion.

In this mode, the upper pressing member having the opposing surface as described above can further suppress occurrence of rattling of the retained portion that is retained on the support member in the lifting work.

In the work machine suspension device, each of the plurality of retention devices may further include: a first side pressing member that is interposed between the first leg portion main body and the second leg portion main body so as to be supported by at least one of the first leg portion main body and the proximal end portion, and has a first opposing surface opposed to a first side portion of the retained portion that is retained on the support member; and a second side pressing member that is interposed between the first leg portion main body and the second leg portion main body so as to be supported by at least one of the second leg portion main body and the proximal end portion, and has a second opposing surface opposed to a second side portion of the retained portion that is retained on the support member.

In this mode, even in a case where due to a relatively large difference between a horizontal distance between the first leg portion main body and the second leg portion main body and a horizontal dimension of the retained portion, a relatively large gap is formed between the leg portion main bodies and the retained portion, the gap is reduced by the first and second side pressing members interposed between the first leg portion main body and the second leg portion main body. As a result, it is possible to suppress occurrence of rattling of the retained portion that is retained on the support member.

In the work machine suspension device, each of the plurality of retention devices preferably further includes a side pressing member moving mechanism that operates so as to change a horizontal distance between the first opposing surface and the second opposing surface by conducting at least one of relative movement of the first side pressing member with respect to the first leg portion main body and relative movement of the second side pressing member with respect to the second leg portion main body.

In this mode, the horizontal distance between the first opposing surface and the second opposing surface can be changed according to the horizontal dimension of the retained portion. As a result, even in a case where the horizontal dimension of the retained portion differs for each lifting work, it is possible to adjust the horizontal distance between the first opposing surface and the second opposing surface to be suitable for the horizontal dimension of the retained portion, thereby suppressing occurrence of rattling of the retained portion that is retained on the support member.

It is preferable that in the work machine suspension device, the first opposing surface has a shape corresponding to a shape of the first side portion of the retained portion that is retained on the support member, and that the second opposing surface has a shape corresponding to a shape of the second side portion of the retained portion that is retained on the support member.

In this mode, the first side pressing member having the first opposing surface and the second side pressing member having the second opposing surface as described above enable the occurrence of rattling of the retained portion that is retained on the support member to be further suppressed in the lifting work.

In the work machine suspension device, each of the plurality of retention devices may further include an up-down moving mechanism that operates so as to move the first leg portion main body and the second leg portion main body in the up-down direction relative to the proximal end portion.

In this mode, the distance in the up-down direction between the proximal end portion and the support member can be changed by changing relative positions in the up-down direction of the first leg portion main body and the second leg portion main body with respect to the proximal end portion according to the dimension in the up-down direction of the retained portion. As a result, even in a case where the dimension in the up-down direction of the retained portion differs for each lifting work, the relative positions of the first leg portion main body and the second leg portion main body with respect to the proximal end portion can be adjusted to positions suitable for the dimension in the up-down direction of the retained portion, thereby suppressing occurrence of rattling of the retained portion that is retained on the support member.

In the work machine suspension device, each of the plurality of retention devices may further include a side moving mechanism that operates so as to change a horizontal distance between the first leg portion main body and the second leg portion main body by moving at least one of the first leg portion main body and the second leg portion main body relative to the proximal end portion.

In this mode, the horizontal distance between the first leg portion main body and the second leg portion main body can be changed according to the horizontal dimension of the retained portion. As a result, even in a case where the horizontal dimension of the retained portion differs for each lifting work, the horizontal distance between the first leg portion main body and the second leg portion main body can be adjusted to be suitable for the horizontal dimension of the retained portion, thereby suppressing occurrence of rattling of the retained portion that is retained on the support member.

In the work machine suspension device, each of a lower end portion of the first leg portion and a lower end portion of the second leg portion preferably has such an inclined surface that makes a distance in a horizontal direction between the lower end portions increase downward.

In this mode, the retained portion can smoothly enter between the first leg portion main body and the second leg portion main body while being guided by the inclined surface.

There is provided a retention device to be attached to a structure member included in a work machine for conducting lifting work of lifting up the structure member by lifting equipment. The retention device includes: a proximal end portion; a first leg portion that is supported by the proximal end portion and includes a first leg portion main body that is disposed below the proximal end portion; a second leg portion that is supported by the proximal end portion and includes a second leg portion main body disposed below the proximal end portion, the second leg portion main body being disposed at an interval in a horizontal direction from the first leg portion main body; and a support member supported by the first leg portion main body so as to be movable between an entry allowed position and a retention position. The entry allowed position is a position where the support member retracts from the second leg portion main body to allow a retained portion as a part of the structure member to enter between the first leg portion main body and the second leg portion main body, and the retention position is a position where the retained portion is retained on the support member while the support member is supported by the first leg portion main body and the second leg portion main body.

This retention device enables worker's labor to be reduced in the lifting work and time required for the lifting work to be shortened.

The retention device preferably further includes: a support member moving mechanism that operates so as to move the support member between the entry allowed position and the retention position; and a drive part that drives the support member moving mechanism.

In this mode, since the support member is moved between the retention position and the entry allowed position by the support member moving mechanism driven by the drive part, it is not necessary for the worker to manually move the support member, resulting in further reducing the labor of the worker.

In the retention device, the support member preferably has a contact surface in contact with the retained portion that is retained on the support member, the contact surface having a shape corresponding to a shape of the retained portion.

In this mode, the support member having the contact surface as described above can retain the retained portion more stably in the lifting work.

The retention device preferably further includes a restricting portion configured to be switched between a restriction state of restricting movement of the support member from the retention position and an allowable state of allowing the support member to move from the retention position to the entry allowed position.

In this mode, when the structure member is lifted up in the lifting work, it is possible to reliably prevent the support member from moving from the retention position to the entry allowed position against an intention of work-related personnel such as the worker or the operator.

The retention device may further include an upper pressing member that is interposed between the proximal end portion and the support member so as to be supported by at least one of the proximal end portion, the first leg portion, and the second leg portion, the upper pressing member having an opposing surface opposed to an upper portion of the retained portion that is retained on the support member.

In this mode, even in a case where a relatively large gap is formed between the retained portion and the proximal end portion due to a relatively large difference between a distance in an up-down direction between the proximal end portion and the support member and a dimension in the up-down direction of the retained portion, the gap is reduced by the upper pressing member interposed between the proximal end portion and the support member. As a result, it is possible to suppress occurrence of rattling of the retained portion that is retained on the support member.

The retention device preferably further includes an upper pressing member moving mechanism that operates so as to move the upper pressing member in an up-down direction relative to the proximal end portion.

In this mode, a relative position of the upper pressing member with respect to the proximal end portion can be changed according to the dimension in the up-down direction of the retained portion. As a result, even in a case where the dimension in the up-down direction of the retained portion differs for each lifting work, the relative position of the upper pressing member can be adjusted to a position suitable for the dimension in the up-down direction of the retained portion, thereby enabling occurrence of rattling of the retained portion that is retained on the support member to be suppressed.

The retention device may further include a first side pressing member that is interposed between the first leg portion main body and the second leg portion main body so as to be supported by at least one of the first leg portion main body and the proximal end portion, and has a first opposing surface opposed to a first side portion of the retained portion that is retained on the support member; and a second side pressing member that is interposed between the first leg portion main body and the second leg portion main body so as to be supported by at least one of the second leg portion main body and the proximal end portion, and has a second opposing surface opposed to a second side portion of the retained portion that is retained on the support member.

In this mode, even in a case where due to a relatively large difference between a horizontal distance between the first leg portion main body and the second leg portion main body and a horizontal dimension of the retained portion, a relatively large gap is formed between the leg portion main bodies and the retained portion, the gap is reduced by the first and second side pressing members interposed between the first leg portion main body and the second leg portion main body. As a result, it is possible to suppress occurrence of rattling of the retained portion that is retained on the support member.

The retention device preferably further includes a side pressing member moving mechanism that operates so as to change a horizontal distance between the first opposing surface and the second opposing surface by conducting at least one of relative movement of the first side pressing member with respect to the first leg portion main body and relative movement of the second side pressing member with respect to the second leg portion main body.

In this mode, the horizontal distance between the first opposing surface and the second opposing surface can be changed according to the horizontal dimension of the retained portion. As a result, even in a case where the horizontal dimension of the retained portion differs for each lifting work, it is possible to adjust the horizontal distance between the first opposing surface and the second opposing surface to be suitable for the horizontal dimension of the retained portion, thereby suppressing occurrence of rattling of the retained portion that is retained on the support member.

The retention device may further include an up-down moving mechanism that operates so as to move the first leg portion main body and the second leg portion main body in the up-down direction relative to the proximal end portion.

In this mode, the distance in the up-down direction between the proximal end portion and the support member can be changed by changing relative positions in the up-down direction of the first leg portion main body and the second leg portion main body with respect to the proximal end portion according to the dimension in the up-down direction of the retained portion. As a result, even in a case where the dimension in the up-down direction of the retained portion differs for each lifting work, the relative positions of the first leg portion main body and the second leg portion main body with respect to the proximal end portion can be adjusted to positions suitable for the dimension in the up-down direction of the retained portion, thereby suppressing occurrence of rattling of the retained portion that is retained on the support member.

The retention device may further include a side moving mechanism that operates so as to change a horizontal distance between the first leg portion main body and the second leg portion main body by moving at least one of the first leg portion main body and the second leg portion main body relative to the proximal end portion.

In this mode, the horizontal distance between the first leg portion main body and the second leg portion main body can be changed according to the horizontal dimension of the retained portion. As a result, even in a case where the horizontal dimension of the retained portion differs for each lifting work, the horizontal distance between the first leg portion main body and the second leg portion main body can be adjusted to be suitable for the horizontal dimension of the retained portion, thereby suppressing occurrence of rattling of the retained portion that is retained on the support member.

There is provided a method for suspending a structure member by using the work machine suspension device to lift up the structure member, the method including: a step of disposing the support member of each of the plurality of retention devices at the entry allowed position; a step of moving each of the plurality of retention devices downward relative to the corresponding retained portion to cause the corresponding retained portion to enter between the first leg portion main body and the second leg portion main body; a step of moving the support member of each of the plurality of retention devices from the entry allowed position to the retention position; and a step of lifting up the structure member by lifting up the attachment part of the work machine suspension device by the lifting equipment.

This method for suspending a structure member makes it possible to simplify or omit the assisting work by the worker in the raising process of the hook by the hook raising operation, and enables the operator to quickly conduct the hook raising operation. Therefore, this suspending method enables worker's labor to be reduced in the lifting work and time required for the lifting work to be shortened.

The invention claimed is:

1. A work machine suspension device for conducting lifting work of lifting up a structure member included in a work machine by a lifting equipment, the work machine suspension device comprising:

an attachment part to be attached to the lifting equipment in the lifting work; and a plurality of retention devices supported by the attachment part, wherein each of the plurality of retention devices includes:

a proximal end portion connected to the attachment part;

a first leg portion that is supported by the proximal end portion and includes a first leg portion main body that is disposed below the proximal end portion;

a second leg portion that is supported by the proximal end portion and includes a second leg portion main body disposed below the proximal end portion, the second leg portion main body being disposed at an interval in a horizontal direction from the first leg portion main body; and a support member supported by the first leg portion main body so as to be movable between an entry allowed position and a retention position, the entry allowed position being a position where the support member retracts from the second leg portion main body to allow a retained portion as a part of the structure member to enter between the first leg portion main body and the second leg portion main body, and the retention position being a position where the retained portion is retained on the support member while the support member is supported by the first leg portion main body and the second leg portion main body, wherein each of the plurality of retention devices further includes an upper pressing member that is interposed between the proximal end portion and the support member so as to be supported by at least one of the proximal end portion, the first leg portion, and the second leg portion, the upper pressing member having an opposing surface opposed to an upper portion of the retained portion that is retained on the support member.

2. The work machine suspension device according to claim 1, wherein the attachment part includes a base member that supports the plurality of retention devices, and the plurality of retention devices are fixed to the base member so as to be capable of hanging from the base member at intervals from each other in a horizontal direction.

3. The work machine suspension device according to claim 1, wherein each of the plurality of retention devices further includes:

a support member moving mechanism that operates so as to move the support member between the entry allowed position and the retention position; and a drive part that drives the support member moving mechanism.

4. The work machine suspension device according to claim 1, wherein the support member has a contact surface in contact with the retained portion that is retained on the support member, the contact surface having a shape corresponding to a shape of the retained portion.

5. The work machine suspension device according to claim 1, wherein each of the plurality of retention devices further includes a restricting portion configured to be switched between a restriction state of restricting movement of the support member from the retention position and an allowable state of allowing the support member to move from the retention position to the entry allowed position.

6. The work machine suspension device according to claim 1, wherein each of the plurality of retention devices further includes an upper pressing member moving mechanism that operates so as to move the upper pressing member in an up-down direction relative to the proximal end portion.

7. The work machine suspension device according to claim 1, wherein the opposing surface of the upper pressing member has a shape corresponding to a shape of the upper portion of the retained portion.

8. The work machine suspension device according claim 1, wherein each of the plurality of retention devices further includes:

a first side pressing member that is interposed between the first leg portion main body and the second leg portion main body so as to be supported by at least one of the first leg portion main body and the proximal end portion, and has a first opposing surface opposed to a first side portion of the retained portion that is retained on the support member; and a second side pressing member that is interposed between the first leg portion main body and the second leg portion main body so as to be supported by at least one of the second leg portion main body and the proximal end portion, and has a second opposing surface opposed to a second side portion of the retained portion that is retained on the support member.

9. The work machine suspension device according to claim 8, wherein each of the plurality of retention devices further includes a side pressing member moving mechanism that operates so as to change a horizontal distance between the first opposing surface and the second opposing surface by conducting at least one of relative movement of the first side pressing member with respect to the first leg portion main body and relative movement of the second side pressing member with respect to the second leg portion main body.

10. The work machine suspension device according to claim 8, wherein the first opposing surface has a shape corresponding to a shape of the first side portion of the retained portion that is retained on the support member, and the second opposing surface has a shape corresponding to a shape of the second side portion of the retained portion that is retained on the support member.

11. The work machine suspension device according to claim 1, wherein each of the plurality of retention devices further includes an up-down moving mechanism that operates so as to move the first leg portion main body and the second leg portion main body in the up-down direction relative to the proximal end portion.

12. The work machine suspension device according to claim 1, wherein each of the plurality of retention devices further includes a side moving mechanism that operates so as to change a horizontal distance between the first leg portion main body and the second leg portion main body by moving at least one of the first leg portion main body and the second leg portion main body relative to the proximal end portion.

13. The work machine suspension device according to claim 1, wherein each of a lower end portion of the first leg portion and a lower end portion of the second leg portion has such an inclined surface that makes a distance in a horizontal direction between the lower end portions increase downward.

14. A method for suspending a structure member by using the work machine suspension device according to claim 1 to lift up the structure member, the method comprising:

a step of disposing the support member of each of the plurality of retention devices at the entry allowed position;

a step of moving each of the plurality of retention devices downward relative to the retained portion to cause the corresponding retained portion to enter between the first leg portion main body and the second leg portion main body;

a step of moving the support member of each of the plurality of retention devices from the entry allowed position to the retention position; and a step of suspending the structure member by lifting up the attachment part of the work machine suspension device by the lifting equipment, wherein the opposing surface of the upper pressing member is opposed to the upper portion of the retained portion that is retained on the support member.

15. A retention device to be attached to a structure member included in a work machine for conducting lifting work of lifting up the structure member by a lifting equipment, the retention device comprising:

a proximal end portion;

a first leg portion that is supported by the proximal end portion and includes a first leg portion main body that is disposed below the proximal end portion;

a second leg portion that is supported by the proximal end portion and includes a second leg portion main body disposed below the proximal end portion, the second leg portion main body being disposed at an interval in a horizontal direction from the first leg portion main body;

a support member supported by the first leg portion main body so as to be movable between an entry allowed position and a retention position, and an upper pressing member that is interposed between the proximal end portion and the support member so as to be supported by at least one of the proximal end portion, the first leg portion, and the second leg portion, the entry allowed position being a position where the support member retracts from the second leg portion main body to allow a retained portion as a part of the structure member to enter between the first leg portion main body and the second leg portion main body, and the retention position being a position where the retained portion is retained on the support member while the support member is supported by the first leg portion main body and the second leg portion main body, wherein the upper pressing member has an opposing surface opposed to an upper portion of the retained portion that is retained on the support member.

16. The retention device according to claim 15, further comprising:

a support member moving mechanism that operates so as to move the support member between the entry allowed position and the retention position; and a drive part that drives the support member moving mechanism.

17. The retention device according to claim 15, wherein the support member has a contact surface in contact with the retained portion that is retained on the support member, the contact surface having a shape corresponding to a shape of the retained portion.

18. The retention device according to claim 15, further comprising a restricting portion configured to be switched between a restriction state of restricting movement of the support member from the retention position and an allowable state of allowing the support member to move from the retention position to the entry allowed position.

19. The retention device according to claim 15, further comprising an upper pressing member moving mechanism that operates so as to move the upper pressing member in an up-down direction relative to the proximal end portion.

* * * * *